United States Patent
Morisawa et al.

(10) Patent No.: US 6,484,832 B1
(45) Date of Patent: Nov. 26, 2002

(54) APPARATUS FOR CONTROLLING AUTOMOTIVE VEHICLE HAVING A PLURALITY OF DRIVE POWER SOURCES

(75) Inventors: Kunio Morisawa, Toyota (JP); Eiji Ichioka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/634,868

(22) Filed: Aug. 7, 2000

(30) Foreign Application Priority Data

Aug. 27, 1999 (JP) .......................... 11-241874

(51) Int. Cl.[7] .............................................. B60K 1/00
(52) U.S. Cl. .................. 180/65.2; 180/65.4; 701/22
(58) Field of Search ............... 180/65.2–65.4, 180/65.8; 701/22

(56) References Cited

U.S. PATENT DOCUMENTS

| | | | | |
|---|---|---|---|---|
| 5,656,921 A | * | 8/1997 | Farrall | 322/40 |
| 5,697,466 A | * | 12/1997 | Moroto et al. | 180/65.2 |
| 5,785,138 A | * | 7/1998 | Yoshida | 180/65.2 |
| 5,875,864 A | * | 3/1999 | Yano et al. | 180/65.4 |
| 5,909,094 A | * | 6/1999 | Yamada et al. | 318/140 |
| 5,951,614 A | * | 9/1999 | Tabata et al. | 701/54 |
| 5,984,033 A | * | 11/1999 | Tamagawa et al. | 180/65.2 |
| 6,007,443 A | * | 12/1999 | Onimaru et al. | 475/5 |
| 6,018,694 A | * | 1/2000 | Egami et al. | 701/102 |
| 6,041,877 A | * | 3/2000 | Yamada et al. | 180/65.2 |
| 6,054,844 A | * | 4/2000 | Frank | 322/16 |
| 6,083,139 A | * | 7/2000 | Deguchi et al. | 477/5 |
| 6,098,733 A | * | 8/2000 | Ibaraki et al. | 180/65.2 |
| 6,137,250 A | * | 10/2000 | Hirano et al. | 318/376 |
| 6,164,400 A | * | 12/2000 | Jankovic et al. | 180/65.2 |
| 6,170,587 B1 | * | 1/2001 | Bullock | 180/69.6 |

FOREIGN PATENT DOCUMENTS

| | | |
|---|---|---|
| JP | 55-110328 | 8/1980 |
| JP | 55-127624 | 9/1980 |
| JP | 63-284030 | 11/1988 |
| JP | 6-166344 | 6/1994 |
| JP | 6-166349 | 6/1994 |
| JP | 7-125556 | 5/1995 |
| JP | 7-231508 | 8/1995 |
| JP | 8-300964 | 11/1996 |
| JP | 8-300965 | 11/1996 |

* cited by examiner

*Primary Examiner*—Eric Culbreth
*Assistant Examiner*—L. Lum
(74) *Attorney, Agent, or Firm*—Oblon, Spivak, McClelland, Maier & Neustadt, P.C.

(57) ABSTRACT

An apparatus for controlling an automotive vehicle having a primary drive power source and an auxiliary drive power source. The apparatus includes a controller adapted to control the auxiliary drive power source such that an assisting drive torque which is generated by the auxiliary drive power source and applied to the vehicle in addition to a primary drive torque generated by the primary drive power source increases with an increase of a required output of the vehicle desired by the vehicle operator, and such that the auxiliary drive power source is operated for a length of time which decreases with the increase of the required output of the vehicle.

19 Claims, 15 Drawing Sheets

APPARATUS FOR CONTROLLING AUTOMOTIVE VEHICLE HAVING A PLURALITY OF DRIVE POWER SOURCES

This application is based on Japanese Patent Application No. 11-241874 filed Aug. 27, 2000, the content of which is incorporated hereinto by reference.

BACKGROUND OF THE INVENTION

1. Field of the Invention

The present invention relates to an apparatus for controlling an automotive vehicle equipped with a primary drive power source and a secondary or auxiliary drive power source, and more particularly to a drive control apparatus for an all-wheel-drive vehicle wherein one of a front-wheel drive system and a rear-wheel drive system is driven by the primary drive power source while the other drive system is driven by the auxiliary drive power source.

2. Discussion of the Related Art

An automotive vehicle equipped with a primary and a secondary or auxiliary drive power source is known. One example of this type of automotive vehicle is an all-wheel-drive vehicle wherein one of a front-wheel and a rear-wheel drive system is driven by the primary drive power source in the form of an engine (internal combustion engine) while the other drive system is driven by the auxiliary drive power source in the form of an electric or hydraulic motor. For improving the drivability of this type of all-wheel-drive automotive vehicle while maximizing the fuel economy or maintaining desired running characteristics of the vehicle, there is provided a motor drive mode which is selected to apply an output torque of the electric motor to the above-indicated other drive system as an assisting drive torque when it is desired to accelerate the vehicle.

The all-wheel-drive automotive vehicle indicated above can be accelerated even on a frozen, snow-covered or other roadway surface having a low friction coefficient, by driving the auxiliary drive wheels by the auxiliary drive power source (electric motor), when it is desired to accelerate the vehicle in an intermediate degree, during running of the vehicle at a relatively low speed. In this respect, there is known a control apparatus adapted to control the auxiliary drive power source so as to prevent a speed difference of the auxiliary drive wheels, when the vehicle is running straight without deceleration thereof on a roadway surface having a low friction coefficient. An example of this control apparatus is disclosed in JP-A-7-125556.

The known control apparatus for the automotive vehicle having a plurality of drive power sources as described above is not satisfactory in its capability of controlling the auxiliary drive power source, and tends to suffer from drawbacks in terms of the fuel economy and the driving characteristics of the vehicle.

SUMMARY OF THE INVENTION

It is therefore an object of the present invention to provide an apparatus for controlling an automotive vehicle equipped with a plurality of drive power source, which apparatus assures satisfactory fuel economy and driving characteristics of the vehicle.

The above object may be achieved according to a first aspect of this invention, which provides an apparatus for controlling an automotive vehicle having a primary drive power source and an auxiliary drive power source, comprising; (a) required output determining means for determining a required output of the vehicle which is desired by an operator of the vehicle; and (b) first control means for controlling the auxiliary drive power source such that an assisting drive torque which is generated by the auxiliary drive power source and applied to the vehicle in addition to a primary drive torque generated by the primary drive power source increases with an increase of the required output of the vehicle and such that the auxiliary drive power source is operated for a length of time which decreases with the increase of the required output.

In the apparatus constructed according to the first aspect of the invention described above, the first control means controls the auxiliary drive power source such that the assisting drive torque generated by the auxiliary drive power source increases with an increase of the operator's desired output of the vehicle and such that the length of time during which the auxiliary drive power source is operated decreases with the increase of the operator's desired vehicle output. Thus, the auxiliary drive power source is suitably controlled. For example, the required vehicle output desired by the vehicle operator is represented by the operating angle or amount of an accelerator pedal. The first control means permits an increase of the total drive force of the vehicle corresponding to to the operating amount of the accelerator pedal, with the assisting drive torque generated by the auxiliary drive power source, so that a further increase in the operating amount of the accelerator pedal is prevented, and the required amount of fuel consumption by the vehicle is reduced.

The control apparatus is preferably applicable to an automotive vehicle wherein the primary drive power source, which may be an internal combustion engine, is used to drive one of a front-wheel drive system and a rear-wheel drive system, while the auxiliary drive power source, which may be an electric motor, is used to drive the other of the front- and rear-wheel drive systems. In this case, both of the front- and rear-wheel drive systems are driven while the auxiliary drive power source is operated, so that the vehicle can be suitably driven or accelerated with a suitable total drive force, even on a frozen or snow-covered surface or any other roadway surface having a comparatively low friction coefficient.

The control apparatus constructed according to a first preferred form of the above-indicated first aspect of the present invention further comprises assisting drive torque compensating means for compensating the assisting drive torque as determined by the first control means, so as to determine a ratio of the assisting drive torque as compensated by the assisting drive torque compensating means to the primary drive torque, so that fuel economy of the internal combustion engine is maximized.

The control apparatus constructed according to a second preferred form of the first aspect of this invention further comprises: roadway surface friction coefficient determining means for determining whether a friction coefficient of a roadway surface on which the vehicle lies is lower than a predetermined threshold; and second control means operable when the roadway surface friction coefficient determining means has determined that the friction coefficient of the roadway surface is lower than the predetermined threshold, the second control means reducing an output of the primary drive power source and operating the auxiliary drive power source, and wherein the first control means operates the auxiliary drive power source such that the assisting drive torque increases with the increase of the required output of the vehicle and such that the length of time of the auxiliary drive power source decreases with the increase of the required output, when the roadway surface friction coefficient determining means has determined that the friction coefficient is not lower than the predetermined threshold.

In the control apparatus constructed according to the second preferred form of the invention, the first control means is operated when the friction coefficient of the roadway surface is comparatively high, to operate the auxiliary drive power source such that the assisting drive torque generated by the auxiliary drive power source increases as the vehicle operator's desired vehicle output is increased, and such that the length of operation of the auxiliary drive power source decreases as the desired vehicle output is increased. Accordingly, the drivability of the vehicle is further improved, making it possible to prevent a further increase of the operating amount of the accelerator pedal and reduce the required amount of fuel consumption by the vehicle.

The control apparatus constructed according to a third preferred form of the first aspect of the invention further comprises third control means operable when the roadway surface friction coefficient determining means has determined that the friction coefficient is not lower than the predetermined threshold, the third control means reducing an output of the primary drive power source with an increase in the assisting drive torque generated by the auxiliary drive power source.

In the control apparatus constructed according to the third preferred form of the first aspect of the invention, the third control means is adapted to reduce the output of the primary drive power source with an increase in the assisting drive torque generated by the auxiliary drive power source, when the roadway surface friction coefficient determining means has determined that the friction coefficient of the roadway surface is comparatively high. Accordingly, the output of the primary drive power source is reduced or limited according to the assisting drive torque generated by the auxiliary drive power source, even when the roadway surface is a dry surface having a comparatively high friction coefficient, so that the fuel consumption of the vehicle can be further reduced.

The above indicated above may also be achieved according to a second aspect of the present invention, which provides an apparatus for controlling an automotive vehicle having a primary drive power source and an auxiliary drive power source, comprising: assisting drive torque control means for operating the primary drive power source to generate a primary drive torque on the basis of a required output of the vehicle which is desired by an operator of the vehicle, and simultaneously operating the auxiliary drive power source such that an assisting drive torque which is generated by the auxiliary drive power source and applied to the vehicle in addition to said primary drive torque is a predetermined percentage of the primary drive torque; and fourth control means operable after initiation of an operation of the auxiliary drive power source, for controlling the auxiliary drive power source so as to optimize a percentage of the assisting drive torque with respect to the primary drive torque, on the basis of an energy consuming state of the primary drive power source.

In the control apparatus constructed according to the above second aspect of the invention, the assisting drive torque control means operates the primary drive power source on the basis of the operator's desired vehicle output and simultaneously operates the auxiliary drive power source such that the assisting drive torque generated by the auxiliary drive power source is a predetermined percentage or ratio of the primary drive torque, and the fourth control means controls the operation of the auxiliary drive power source so as to optimize the percentage of the assisting drive torque with respect to the primary drive torque, on the basis of the state of energy consumption of the primary drive power source after initiation of the operation of the auxiliary drive power source. Accordingly, the energy consumption by the primary drive power source is reduced.

The object indicated above may also be achieved according to a third aspect of the present invention, which provides an apparatus for controlling an automotive vehicle having a primary drive power source and an auxiliary drive power source, comprising; fifth control means for operating the auxiliary drive power source while limiting an output of the primary drive power source when a required output of the vehicle which is desired by an operator of the vehicle is smaller than a predetermined threshold and when a power mode in which the vehicle is driven with high drivability is not selected by the operator, the fifth control means reducing an amount of limitation of the output of the primary drive power source while controlling the auxiliary drive power source, when the required output of the vehicle is not smaller than the predetermined threshold and when the power mode is selected by the operator, such that an assisting drive torque which is generated by the auxiliary drive power source and applied to the vehicle in addition to a primary drive power source generated by the primary drive power source is made larger than that when the required output is smaller than the predetermined threshold and when the power mode is not selected, and such that the auxiliary drive power source is operated for a shorter length of time than when the required output is smaller than the predetermined threshold and when the power mode is not selected.

In the control apparatus constructed according to the third aspect of this invention, the fifth control means operates the auxiliary drive power source while limiting the output of the primary drive power source when the operator's desired vehicle output is relatively small and when the power mode is not selected by the operator, and reduces the amount of limitation of the output of the primary drive power source while controlling the auxiliary drive power source, when the desired vehicle output is relatively large and when the power mode is selected, such that the assisting drive torque generated by the auxiliary drive power source is made larger than in the above-indicated vehicle condition, and such that the auxiliary drive power source is operated for a shorter length of time than in the above-indicated vehicle condition. Thus, the manner of operation of the auxiliary drive power source is changed depending upon when the power mode is selected by the vehicle operator or not, so that the assisting drive torque generated by the auxiliary drive power source is optimized, and the fuel consumption by the primary drive power source is reduced. Further, the amount of limitation of the output of the primary drive power source is reduced when the power mode is selected by the operator, so that the drivability of the vehicle is improved.

The object indicated above may also be achieved according to a fourth aspect of the present invention, which provides an apparatus for controlling an automotive vehicle having a primary drive power source, an energy storing means for storing an energy, an auxiliary drive power source operated with the energy stored in the energy storing means, and energy generating means operated by the primary drive power source, for generating an energy, comprising: required output determining means for determining whether a required output of the vehicle which is desired by an operator of the vehicle is larger than a predetermined threshold; and sixth control means for supplying the energy from the energy storing means to the auxiliary drive power source such that an assisting drive torque which is generated by the auxiliary drive power source and applied to the vehicle in addition to a primary drive torque generated by the primary drive power source is relatively small, while the required output of the vehicle determined by the required output determining means is not larger than the predetermined threshold, and wherein while the required output of the vehicle determined by the required output determining means is larger than the predetermined threshold, the sixth control means supplies not only the energy stored in the energy storing means but also the energy generated by the energy generating means to the auxiliary drive power source, such that the assisting drive torque generated by the auxiliary drive power source is larger than while the required output is not larger than the predetermined threshold and such that the auxiliary drive power source is operated for a length of time shorter than while the required output is not larger than the predetermined threshold.

In the control apparatus constructed according to the above fourth aspect of the invention, the sixth control means operates in two different manners depending upon whether the vehicle output desired by the operator is larger than the predetermined threshold or not. While the operator's desired vehicle output is not larger than the threshold, the sixth control means supplies the energy from the energy storing means to the auxiliary drive power source such that the assisting drive torque generated by the auxiliary drive power source is relatively small. While the operator's desired vehicle output is larger than the threshold, the sixth control means supplies not only the energy stored in the energy storing means but also the energy generated by the energy generating means operated by the primary drive power source, to the auxiliary drive power source, such that the assisting drive torque is larger than while the desired vehicle output is not larger than the threshold and such that the length of time of operation of the auxiliary drive power source is shorter than while the desired vehicle output is not larger than the threshold. Accordingly, the operation of the auxiliary drive power source is maximized, and the drivability of the vehicle is improved when the vehicle load is large or the desired vehicle drive power is comparatively large.

The object indicated above may also be achieved according to a fifth aspect of the present invention, which provides an apparatus for controlling an automotive vehicle having a primary drive power source, an energy storing means for storing an energy, an auxiliary drive power source operated with the energy stored in the energy storing means, energy generating means operated by the primary drive power source, for generating an energy, and a transmission operatively connected to the primary drive power source, comprising: stored energy amount determining means for determining whether an amount of energy stored in the energy storing means is smaller than a predetermined threshold; and seventh control means operable when the stored energy amount determining means has determined that the amount of energy stored in the energy storing means is smaller than the predetermined threshold, for supplying the energy from the energy generating means to the auxiliary drive power source, and increasing a speed ratio of the transmission so as to increase a drive force of the vehicle.

In the control apparatus constructed according to the above fifth aspect of the invention, the seventh control means is operated when the amount of energy stored in the energy storing means is insufficient or smaller than the predetermined threshold. The seventh control means supplies the energy from the energy generating means operated by the primary drive power source, to the auxiliary drive power source, and increases the speed ratio of the transmission so as to increase the vehicle drive force. As a result of an increase in the speed ratio of the transmission, the output of the auxiliary drive power source is optimized even while the energy amount stored in the energy storing means is reduced.

The object indicated above may also be achieved according to a sixth aspect of this invention, which provides an apparatus for controlling an automotive vehicle having a primary drive power source, an energy storing means for storing an energy, an auxiliary drive power source operated with the energy stored in the energy storing means, and energy generating means operated by the primary drive power source, for generating an energy, comprising:

eighth control means for operating said auxiliary drive power source with an energy suppled from the energy generating means, in a selected one of a first mode and a second mode, the eighth control means operating the auxiliary drive power source in the first mode such that a moment of initiation of an operation of the auxiliary drive power source with the energy supplied from the energy storing means is retarded by a predetermined time after a moment at which an operation performed by an operator of the vehicle to increase an output of the vehicle is initiated, the eighth control means operating the auxiliary drive power source in the second mode such that the operation of the auxiliary drive power source with the energy supplied from the energy storing means is initiated at the moment at which the operation performed by the operator is initiated.

In the control apparatus constructed according to the sixth aspect of the invention, the eighth control means is operated, upon supplying of the energy from the energy generating means to the auxiliary drive power source, in a selected one of the first and second modes. In the first mode, the moment of initiation of the operation of the auxiliary drive power source with the energy supplied from the energy generating means is retarded by the predetermined time after the moment of an operation performed by the vehicle operator (e.g., an operation of an accelerator pedal) to increase the vehicle output is initiated. In the second mode, the operation of the auxiliary drive power source is initiated at the same time when the operation to increase the vehicle output is initiated. For instance, the first mode is selected when the power mode for driving the vehicle with high drivability is selected, while the second mode is selected when the power mode is not selected.

The object indicated above may also be achieved according to a seventh aspect of the present invention, which provides an apparatus for controlling an automotive vehicle having a primary drive power source, an energy storing means for storing an energy, an auxiliary drive power source operated with the energy stored in the energy storing means, and energy generating means operated by the primary drive power source, for generating an energy, comprising: ninth control means operable when an operation to accelerate the vehicle is performed by an operator of the vehicle, for first initiating a supply of an energy from the energy generating means to the auxiliary drive power source, and then initiating a supply of an energy from the energy storing means to the auxiliary drive power source when a predetermined time has passed after a moment of initiation of the supply of the energy from the energy generating means to the auxiliary drive power source.

In the control apparatus constructed to the above seventh aspect of the invention, the ninth control means is operated when the operator's operation to accelerate the vehicle is performed. The ninth control means first initiates the supply of the energy from the energy generating means operated by the primary drive power source, to the auxiliary drive power source, and then initiates the supply of the energy from the energy storing means to the auxiliary drive power source when the predetermined time has passed after the moment of initiation of the supply of the energy from the energy generating means to the auxiliary drive power source. Accordingly, the acceleration of the vehicle can be increased when the vehicle operator performs an operation to accelerate the vehicle. Further, the vehicle can be accelerated for a sufficiently long time.

BRIEF DESCRIPTION OF THE DRAWINGS

The above and other objects, features, advantages and technical and industrial significance of the present invention will be better understood and appreciated by reading the following detailed description of a presently preferred embodiment of the invention, when considered in connection with the accompanying drawing, in which.

DETAILED DESCRIPTION OF THE PREFERRED EMBODIMENT

Figure 1:
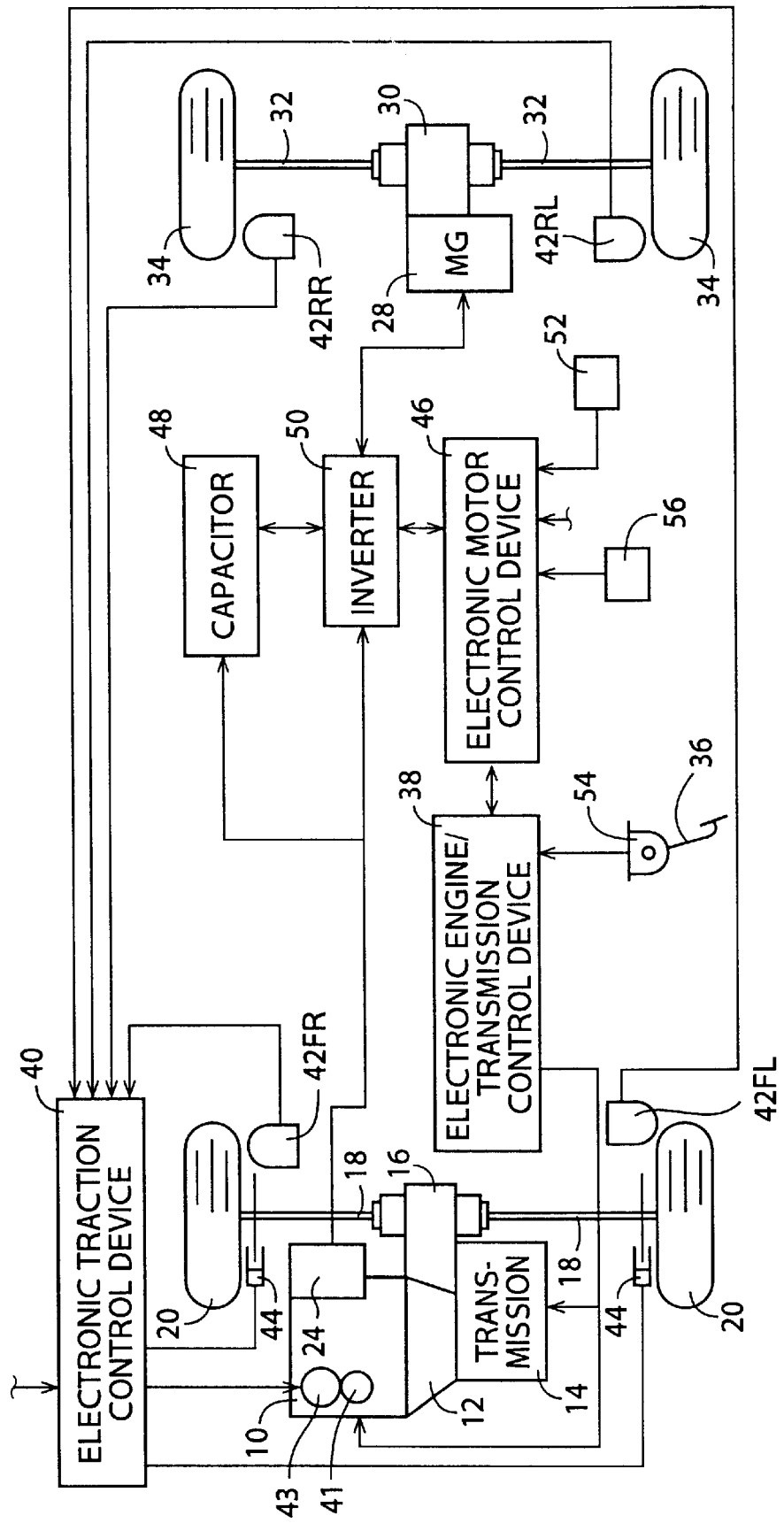
FIG. 1 is a view showing a power transmitting system of an automotive vehicle, and a control apparatus for the power transmitting system, which apparatus is constructed according to one embodiment of this invention.

Referring first to FIG. 1, there is shown a power transmitting system of an automotive vehicle equipped with a control apparatus constructed according to one embodiment of this invention. The vehicle is a four-wheel drive vehicle of a type wherein an internal combustion engine 10 disposed in a front portion of the vehicle is normally used to drive a pair of front drive wheels 20. Namely, the engine 10 serves as a primary drive power source. The engine 10 may be a gasoline or Diesel engine. The output of the engine 10 is transmitted to the front drive wheels 20 through a torque converter 12, a transmission 14, a front differential gear device 16 and a front drive axle 18. The engine 10 is provided with an electric generator 24 which is exclusively used to generate an electric energy. It will be understood that the engine 10, torque converter 12, transmission 14, front differential gear device 16, front drive axle 18 and front drive wheels 20 cooperate to constitute a front-wheel drive system. The present four-wheel drive vehicle does not have a propeller shaft.

The vehicle also has an auxiliary or secondary drive power source in the form of an electric motor/generator (hereinafter abbreviated as "MG") 28. The output of the MG 28 is transmitted to a pair of rear drive wheels 34 through a rear differential gear device 30 and a rear drive axle 32. It will be understood that the MG 28, rear differential gear device 30, rear drive axle 32 and rear drive wheels 34 cooperate to constitute a rear-wheel drive system. When the MG 28 is operated as an electric motor to drive the rear drive wheels 34, the vehicle is driven by all of the four drive wheels 20, 34. The MG 28 also functions as an electric generator when a kinetic energy of the running vehicle is transmitted from the rear drive wheels 34 to the MG 28. That is, the MG 28 may be operated with the kinetic energy of the vehicle, in a regenerative mode as the electric generator, so that a regenerative electric energy is generated by the MG 28 while a regenerative brake is applied by the MG 28 to the vehicle. In the present four-wheel drive vehicle adapted to permit the electric generator 24 to supply a generated electric energy directly to the MG 28 when the vehicle is placed in a four-wheel drive mode, it is preferred that the electric generator 24 have a larger electric energy generating capacity that the MG 28.

The transmission 14 may be a manual transmission, an automatic transmission or a belt-and-pulley type continuously variable transmission. The manual transmission may be of a parallel two-axes type transmission having a plurality of gear sets each consisting of mutually meshing two gears disposed on respective two shafts. The automatic transmission may include a plurality of planetary gear sets whose rotary elements are selectively connected to each other or fixed to a stationary structure, by hydraulically operated frictional coupling devices, so as to establish a selected one of a plurality of operating positions having respective different speed ratios. The belt-and-pulley type transmission may include a pair of pulleys whose effective diameters are continuously variable and which are connected to each other by a belt.

The vehicle has an electronic engine/transmission control device 38 which is adapted to effect various controls such as: a fuel injection control for controlling a time period of fuel injection into the engine 10 on the basis of detected speed $N_E$ of the engine 10 and detected intake air quantity Q/N or intake pipe pressure, and according to a memory-stored predetermined relationship among the time period, engine speed $N_E$ and intake air quantity Q/N or intake pipe pressure; an ignition timing control for controlling a basic ignition timing of the engine 10 on the basis of the detected engine speed $N_E$ and intake air quantity Q/N; an idling speed control for controlling an engine idling control valve so that the actual idling speed of the engine 10 coincides with a predetermined desired value; and a transmission shift control for controlling the transmission 14. Where the transmission 14 is an automatic transmission, the transmission shift control is effected by first selecting one of the operating positions of the transmission 14 on the basis of a detected running speed V of the vehicle and a detected operating amount $A_{cc}$ or angle θ of an accelerator pedal 36 (opening angle $θ_{TH}$ of a throttle valve 41) and according to memory-stored predetermined shift boundary lines, and then controlling the frictional coupling devices so as to establish the selected operating position of the transmission 14. The engine/transmission control device 38 is also adapted to effect a throttle actuator control for controlling a throttle actuator 43 to control the throttle valve 41 such that the opening angle $θ_{TH}$ of the throttle valve 41 corresponds to the operating angle θ of the accelerator pedal 36.

Figure 2:
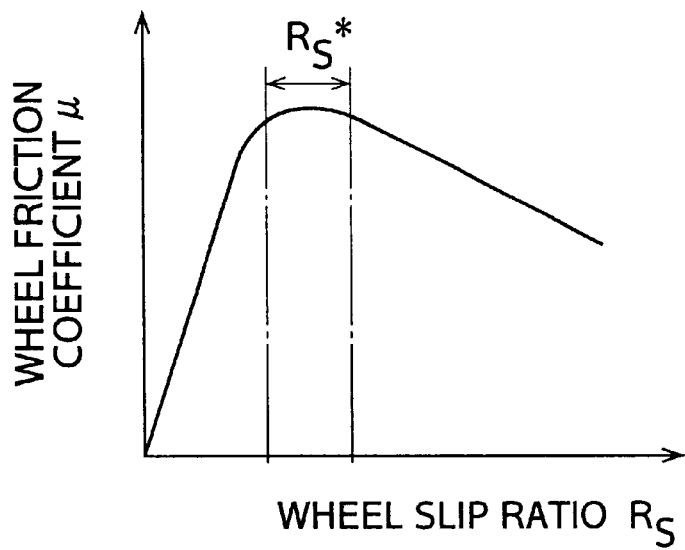
FIG. 2 is a graph for explaining an operation of an electronic traction control device of the control apparatus of FIG. 1.

The vehicle further has an electronic traction control device 40, which is adapted to calculate a speed $V_{FR}$ of the front right wheel 20, a speed $V_{FL}$ of the front left wheel 20, a speed $V_{RR}$ of the rear right wheel 34, a speed $V_{RL}$ of the rear left wheel 34, an average speed $V_F \{=(V_{FR}+V_{FL})/2\}$ of the front wheels 20, an average speed $V_R \{=(V_{RR}+V_{RL})/2\}$ of the rear wheels 34, and the vehicle running speed V. The wheel speeds $V_{FR}$, etc. are expressed as the peripheral speed of the wheels 20, 34 obtained by conversion of the rotating speeds into the vehicle running speed V. The vehicle running speed V is obtained as the lowest one of the wheel speeds $V_{FR}$, $V_{FL}$, $V_{RR}$ and $V_{RL}$. The traction control device 40 is further adapted to calculate a slip speed ΔV which is a difference between the average speed $V_R$ of the rear wheels 34 not driven by the engine 10, and the average speed $V_F$ of the primary or front drive wheels 20 driven by the engine 10. When the slip speed ΔV of the front drive wheels 20 has exceeded a predetermined traction control initiating threshold $ΔV_2$, the traction control device 40 determines that the primary or front drive wheels 20 are slipping of the surface of the roadway, and initiate a predetermined traction control wherein the output of the engine 10 is reduced by controlling the throttle actuator 43 to reduce the opening angle $θ_{TH}$ of the throttle valve 41, or controlling a fuel injector valve so as to reduce its opening angle, while at the same time the front brakes 44 are activated to brake the front drive wheels 20, so that a slip percentage $R_s \{=(ΔV/V_F)×100\%\}$, namely, a ratio of the slip speed ΔV to the average front wheel speed $V_F$ falls within a desired or optimum range $R_{s*}$. Accordingly, the vehicle can be started without an excessive slip of the front wheels 20. In this respect, it is noted that the friction coefficient μ of the wheels on the roadway surface changes with the slip ratio $R_s$ of the wheels, as indicated in the graph of FIG. 2. The optimum range $R_{s*}$ of the slip ratio $R_s$ is selected such that the friction coefficient μ is sufficiently high in that optimum range $R_{s*}$, as also indicated in FIG. 2.

Figure 3:
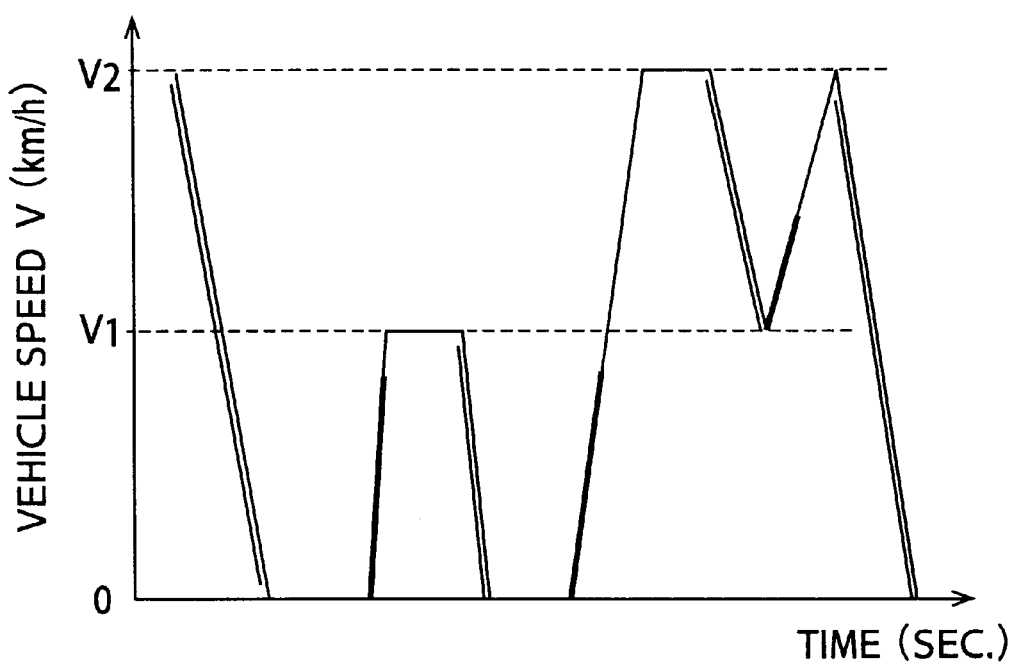
FIG. 3 is a graph for explaining an operation of an electric motor controlled by an electronic motor control device of the control apparatus of FIG. 1, wherein thick lines indicate time periods in which an assisting drive torque is generated by a motor generator, while thin double lines indicate time periods in which the motor generator is operated in a regenerative mode.

The vehicle further has an electronic motor control device 46, which is adapted to effect various controls such as : a regenerative control wherein an electric energy generated by the MG 28 is stored in a capacitor 48 during braking of the vehicle, as indicated by double lines in the graph of FIG. 3; high-μ roadway assisting drive torque controls; and a low-μ roadway assisting drive torque control. The high-μ roadway assisting drive torque controls are effected when the vehicle is started or accelerated on a normal dry roadway surface or other high-μ roadway surface having a sufficiently high friction coefficient μ. In these instances, the motor control device 46 determines a basic assisting drive torque to be generated by the MG 28 on the basis of the detected operating angle θ of the accelerator pedal 36 and a rate of change of this operating angle dθ/dt, and according to a memory-stored predetermined relationship between these parameters θ, dθ/dt and the basic assisting drive torque, so that the basic assisting drive torque is within a range of 20–30% of the total drive torque of the vehicle. The motor control device 46 controls an inverter 50 such that the electric energy is supplied from the capacitor 48 to the MG 28 through the inverter 50, so that the determined basic assisting drive torque is produced by the MG 28 and is applied to the rear drive wheels 34), whereby an assisting drive force produced by the MG 28 is applied to the vehicle in addition to the drive force produced by the engine 10, so as to improve the fuel economy of the vehicle. On the other hand, the low-μ assisting drive torque control is effected when the vehicle is started on a frozen or snow-covered roadway surface or other low-μ roadway surface having a comparatively low friction coefficient μ. In this instance, the MG 28 is operated as the electric motor while at the same time the transmission 14 is shifted down. The motor controller 46 controls the inverter 50, so as to control the current of the electric energy generated by the MG 28, the current of the electric energy applied to the MG 28, the current of the electric energy generated by the electric generator 24, and the amounts of electric energy stored in and supplied from the capacitor 48.

A roadway surface gradient sensor 52 is connected to the motor control device 46. This gradient sensor 52 may be a gravity sensor or a clinometer which is used when the vehicle speed V is substantially zero. The gradient sensor 52 produces an output signal indicative of an inclination angle $\theta_{ROAD}$ or a gradient $\alpha=\tan\theta_{ROAD}$, and the output signal is applied to the motor control device 46. An accelerator pedal position sensor 54 is provided to detect the operating angle $\theta$ of the accelerator pedal 36, on the basis of the operating amount $A_{cc}$ of the accelerator pedal 36. An output signal of this sensor 54 indicative of the operating angle $\theta$ is applied to the engine/transmission control device 38.

A POWER MODE selector switch 56 is also connected to the motor control device 46. This selector switch 56 is operated by the vehicle operator to establish a POWER MODE in which the memory-stored shift boundary lines are changed so that the automatic transmission 14 is likely to be shifted down to lower the speed ratio and thereby improve the drivability of the vehicle. When the selector switch 56 is operated, it generates a POWER MODE SELECT signal, which is applied to the motor control device 46.

Each of the engine/transmission control device 38, traction control device 40 and motor control device 46 is constituted by a so-called microcomputer incorporating a central processing unit (CPU), a read-only memory (ROM), a random-access memory (RAM) and an input and output interface. The CPU operates to process various input signals according to control programs stored in the ROM, while utilizing a temporary data storage function of the RAM. The input signals received by and signals stored in and calculated by each of those control devices 38, 40, 46 are fed to the other control devices as needed, through communication lines.

Figure 4:
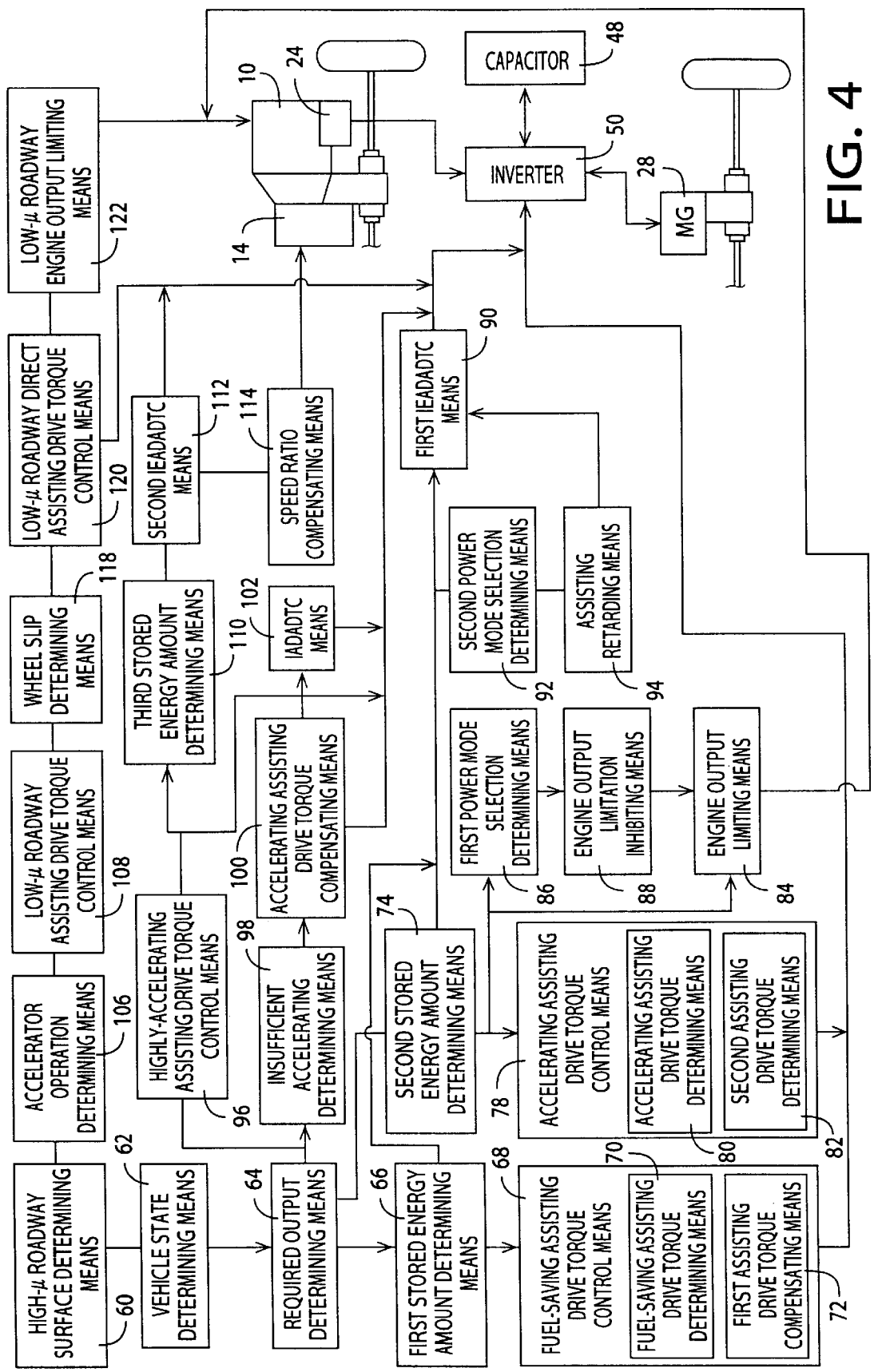
FIG. 4 is a block diagram illustrating functional means of the electronic motor control device of FIG. 1.

Referring to the block diagram of FIG. 4, there will be described various functional means of the motor control device 46 and some functional means of the engine/transmission control means 38. Of the functional means illustrated in FIG. 4, engine output limiting means 84, speed ratio compensating means 114, low-$\mu$ engine output limiting means 122 and means associated with these means 114, 122 are incorporated in the engine/transmission control device 38, while most of the illustrated functional means are incorporated in the motor control means 46.

The motor control means 46 includes high-$\mu$ roadway surface determining means 60 is adapted to determine whether the roadway surface on which the vehicle is running has a high friction coefficient $\mu$ or not, that is, whether the roadway surface is a dry surface having a high friction coefficient $\mu$, or a frozen, snow-covered or other surface having a low friction coefficient $\mu$. This determination is made on the basis of slipping states of the front drive wheels 20 as the primary drive wheels, when the vehicle is accelerated or braked. For instance, the determining means 60 determines that the roadway surface has a high friction coefficient $\mu$, if the slip speed $\Delta V$ indicated above is equal to or lower than the predetermined threshold $\Delta V2$.

The motor control means 46 further includes vehicle state determining means 62 operable when the high-$\mu$ roadway surface determining means 60 has determined that the roadway surface has a high friction coefficient $\mu$. The vehicle state determining means 62 determines whether the vehicle is in a starting state or a running state. This determination is made on the basis of the detected running speed V of the vehicle. For instance, the determining means 62 determines that the vehicle is in a starting state, if the detected running speed V is lower than a predetermined lower limit $V_{x1}$, and that the vehicle is in a running state, if the running speed V is not lower than the lower limit $V_{x1}$. The lower limit $V_{x1}$ may be selected to be about several kilometers per hour.

The motor control means 46 further includes required output determining means 64 for determining whether the output of the vehicle desired by the vehicle operator is small, medium or large, that is, for determining one of three ranges (small, medium and large) of the desired output. This determination is made on the basis of the detected operating angle $\theta$ of the accelerator pedal 36, and the rate of change $d\theta/dt$ of the operating angle $\theta$.

The motor control device 46 further includes first stored energy amount determining means 66 operable when the required output determining means 64 has determined that the required output of the vehicle is small. This determining means 66 determines whether a residual amount SOC of the electric energy which is currently stored in energy storing means in the form of the capacitor 48 for producing an assisting drive torque is larger than a predetermined threshold $SOC_o$ or not. The threshold $SOC_o$ is determined such that the MG 28 can be operated as the electric motor to produce a necessary assisting drive torque which is to be applied to the vehicle in addition to the drive torque produced by the engine 10.

Figure 5:
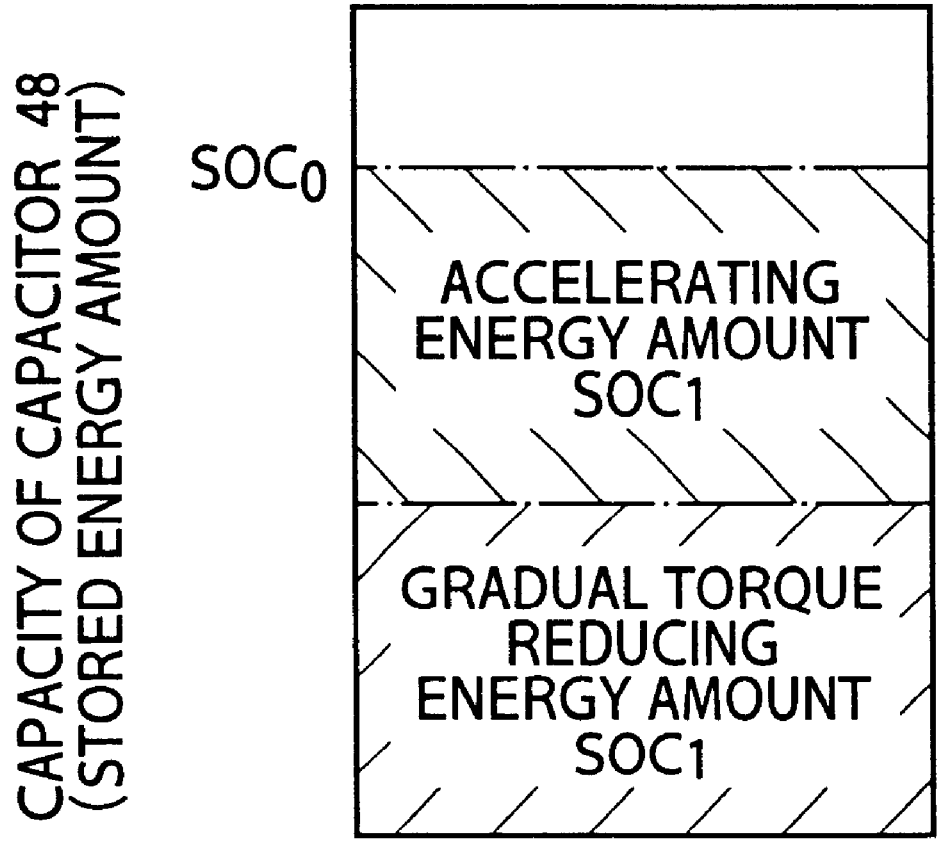
FIG. 5 is an illustration for explaining amounts of electric energy stored in a capacitor shown in FIG. 1.

For the MG 28 to assist the engine 10 to drive the vehicle, the MG 28 requires an accelerating energy amount SOC1 for generating an accelerating torque to accelerate the vehicle, and a gradual torque reducing energy amount SOC2 for generating an assisting drive torque after the acceleration of the vehicle by the accelerating torque, such that the assisting drive torque is gradually reduced so as to prevent a shock upon termination of the assisting operation of the MG 28 as the electric motor. To this end, the capacitor 48 is adapted to store the accelerating energy amount SOC1 and the gradual torque reducing energy amount SOC2, as indicated in FIG. 5. The threshold $SOC_o$ with which the residual energy amount SOC is compared by the determining means 66 is almost equal to a sum of the amounts SOC1 and SOC2, or larger than this sum SOC1+SOC2 by a suitable amount.

The motor control device 46 further includes fuel-saving assisting drive torque control means 68 operable when the first stored energy amount determining means 66 has determined that the residual energy amount SOC in the capacitor 48 is larger than the threshold $SOC_o$. This fuel-saving assisting drive torque control means is adapted to control the inverter 50 so that the electric energy is supplied from the capacitor 48 to the MG 28, for operating the MG 28 for generating an assisting drive torque so as to improve the fuel economy of the engine 10. The fuel-saving assisting drive torque control means 68 includes fuel-saving assisting drive torque determining means 70 and first assisting drive torque compensating means 72.

Figure 6:
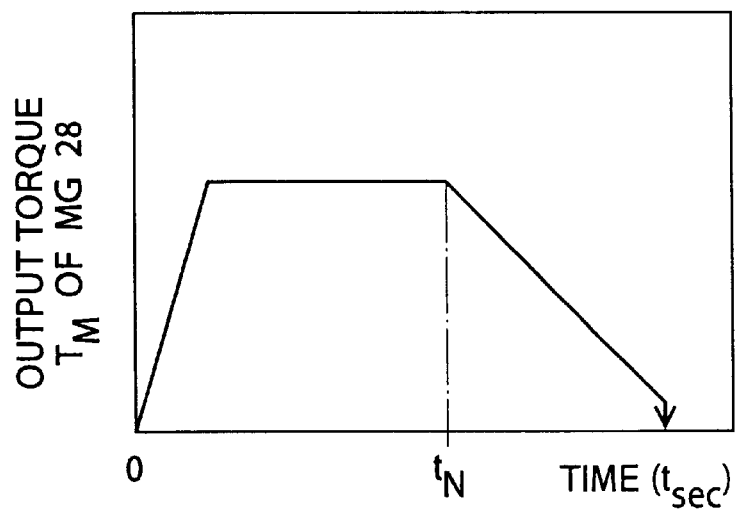
FIG. 6 is a graph for explaining the assisting drive torque generated by the motor generator under the control of fuel-saving assisting drive torque control means.
Figure 7:
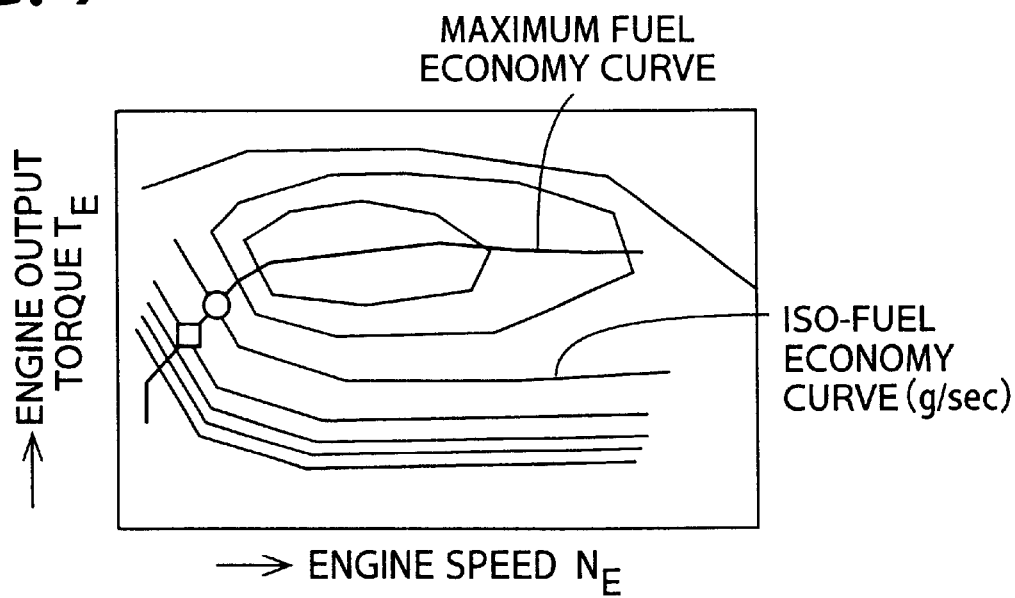
FIG. 7 is a view for explaining a manner of compensation effected by assisting drive torque compensating means.
Figure 8:
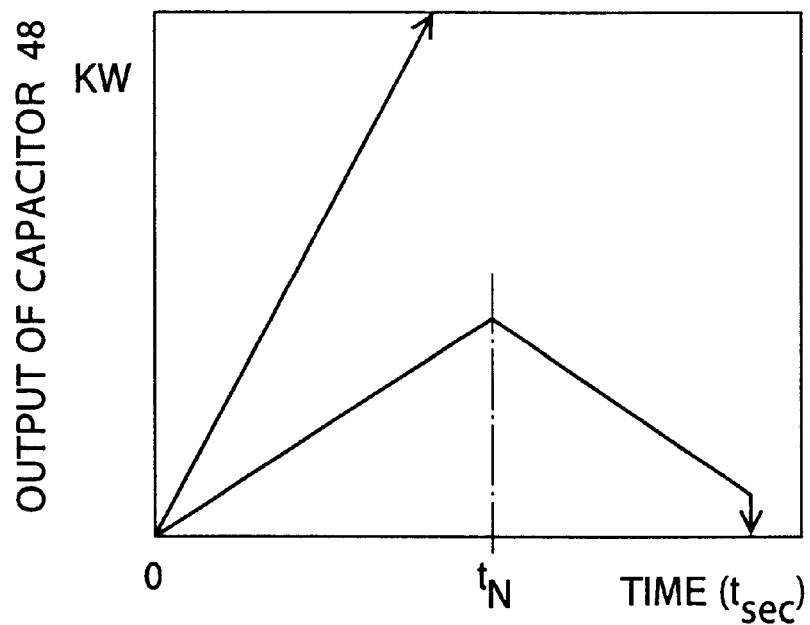
FIG. 8 is a graph showing an output of the capacitor for generating the assisting drive torque under the control of the fuel-saving assisting drive torque control means shown in FIG. 4.

The fuel-saving assisting drive torque determining means 70 determines the above-indicated basic assisting drive torque value or a basic assisting drive energy value, which is a predetermined percentage of the required total vehicle drive torque determined by the desired vehicle output which in turn is determined by the operating angle $\theta$ or its rate of change $d\theta/dt$ explained above. The determining means 70 determines the assisting drive torque to be generated by the MG 28 such that the basic assisting drive torque value determined as described above is generated for a possible longest time, without a variation, as indicated in FIG. 6. The first assisting drive torque compensating means 72 is adapted to compensate the basic assisting drive torque so that the actual operating point (indicated by a circle in FIG. 7) of the engine 10 defined by the presently detected engine output torque $T_E$ and speed $N_E$ before generation of the assisting drive torque by the MG 28 is moved to a calculated point (indicated by a square in FIG. 7) lying on a maximum fuel economy curve after the generation of the assisting drive torque. As indicated in FIG. 7, the actual and calculated operating points of the engine 10 and the maximum fuel economy curve are defined in a two-dimensional coordinate system having an abscissa along which the engine speed $N_E$ is taken, and an ordinate along which the engine output torque $T_E$ is taken. The fuel-saving assisting drive torque control means 68 controls the inverter 50 for controlling the amount of the electric energy (KW) to be supplied from the capacitor 48 to the MG 28, namely, for controlling the output of the capacitor 48, as indicated in FIG. 8 by way of example, so that the MG 28 generates the assisting drive torque $T_M$ as compensated by the compensating means 72. In FIGS. 6 and 8, "$t_N$" represents a point of time before which the electric energy amount to be supplied from the capacitor 48 to the MG 28 increases and after which the same decreases. A time length from the moment of initiation of the supply of the electric energy from the capacitor 48 to the MG 28 to the point of time "$t_N$" may be about several seconds. In FIG. 8, an arrow-headed straight line shown to the left of the bent line representative of the electric energy represents the total output (the output of the engine 10 plus the output of the MG 28) of the vehicle desired by the vehicle operator. It will be understood that the engine 10 is required to produce an output (engine torque) which corresponds to a difference between the desired total vehicle output and the output (assisting drive torque) of the MG 28 which is operated by the electric energy supplied from the capacitor 48.

The motor control device 46 further includes second stored energy amount determining means 74 operable when the required output determining means 64 has determined that the required vehicle output is medium. Like the first stored energy amount determining means 66, the second stored energy amount determining means 74 is adapted to determine whether the residual energy amount SOC of the capacitor 48 is larger than the threshold $SOC_o$.

The motor control device 46 further includes accelerating assisting drive torque control means 78 operable when the second stored energy amount determining means 74 has determined that the residual energy amount SOC is larger than the threshold $SOC_o$. The accelerating assisting drive torque control means 78 is adapted to control the amount of electric energy to be supplied from the capacitor 48 to the MG 28 so that the vehicle can be started or accelerated with sufficiently high drivability. Described in detail, the accelerating assisting drive torque control means 78 includes accelerating assisting drive torque determining means 80 and second assisting torque compensating means 82.

Figure 9:
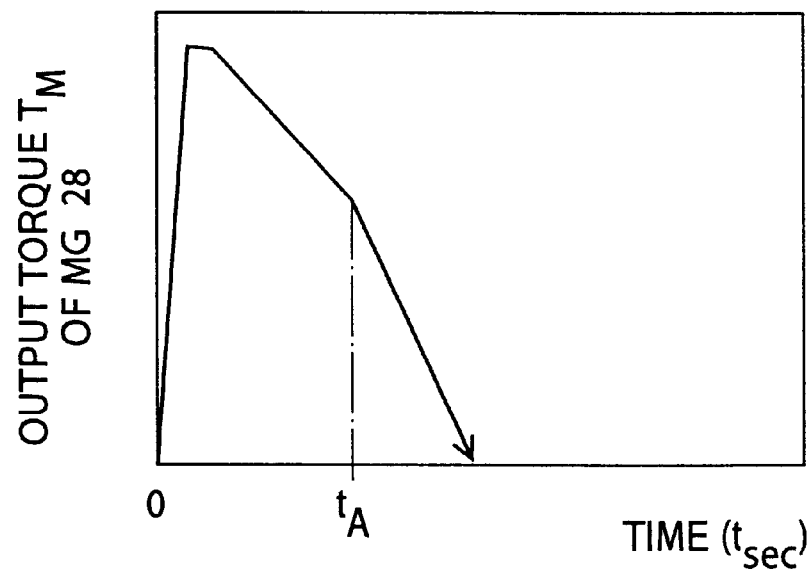
FIG. 9 is a graph for explaining the assisting drive torque generated by the motor generator under the control of accelerating assisting drive torque control means shown in FIG. 4.
Figure 10:
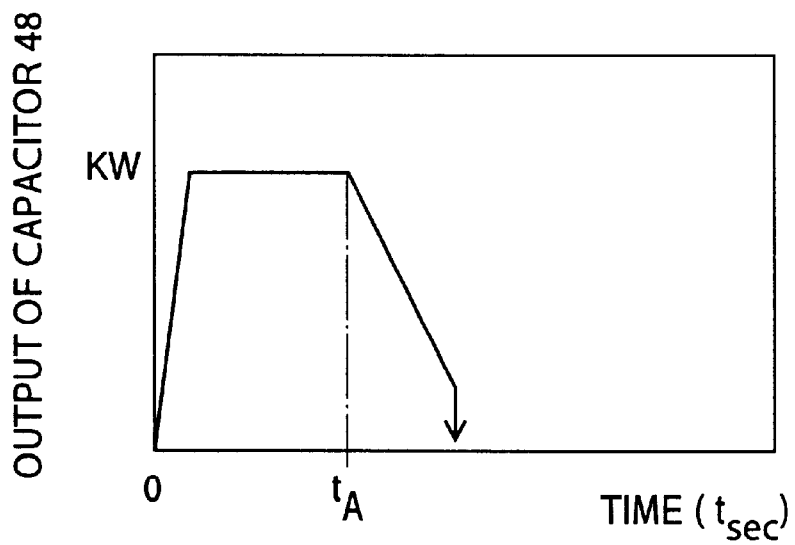
FIG. 10 is a graph showing an output of the capacitor for generating the assisting drive torque under the control of the accelerating assisting drive torque control means shown in FIG. 4.

The accelerating assisting drive torque determining means 80 is adapted to determine the above-indicated basic assisting drive torque value or a basic assisting drive energy value, which is a predetermined percentage of the required total vehicle drive torque determined by the desired vehicle output which in turn is determined by the operating angle θ or its rate of change dθ/dt explained above. The basis assisting drive torque value as determined by the accelerating assisting drive torque determining means 80 is larger than that determined by the fuel-saving assisting drive torque determining means 70. The determining means 80 determines the assisting drive torque to be generated by the MG 28 such that the basic assisting drive torque value determined as described above is generated for a possible shortest time, as indicated in FIG. 9. The second assisting drive torque compensating means 82 is adapted to compensate the basic assisting drive torque so that the actual operating point (indicated by the circle in FIG. 7) of the engine 10 defined by the presently detected engine output torque $T_E$ and speed $N_E$ in the coordinate system of FIG. 7 before generation of the assisting drive torque by the MG 28 is moved to a calculated point (indicated by the square in FIG. 7) lying on the above-indicated maximum fuel economy curve after the generation of the assisting drive torque. The accelerating assisting drive torque control means 78 controls the inverter 50 for controlling the amount of the electric energy (KW) to be supplied from the capacitor 48 to the MG 28, namely, for controlling the output of the capacitor 48, as indicated in FIG. 10 by way of example, so that the MG 28 generates the assisting drive torque $T_M$ as compensated by the compensating means 72. In FIGS. 9 and 10, "$t_A$" represents a point of time before which the accelerating torque and the corresponding electric energy amount increase and after which the accelerating torque and energy amount decrease. A time length from the moment of initiation of the supply of the electric energy from the capacitor 48 to the MG 28 to the point of time "$t_A$" may be about several seconds.

The fuel-saving assisting drive torque determining means 70 and the accelerating assisting drive torque determining means 80 are adapted to determine the assisting drive torque such that the comparatively small assisting drive torque $T_M$ is generated for a comparatively long time (as indicated in FIGS. 6 and 8) when the operator's desired vehicle output as determined by the required output determining 64 is comparatively small, and the comparatively large assisting drive torque $T_M$ is generated for a comparatively short time (as indicated in FIGS. 9 and 10) when the operator's desired vehicle output is comparatively large.

It will be understood that these determining means 70 and 80 cooperate to serve as first control means for controlling the MG 28 to operate as the electric motor such that the assisting drive torque generated by the MG 28 and applied to the vehicle in addition to the primary drive torque generated by the engine 10 increases with an increase in the operator's desired total vehicle output, and such that the MG 28 is operated for a length of time which decreases with the above-indicated increase.

The fuel-saving assisting drive torque determining means 70 and the accelerating assisting drive torque determining means 80 are further adapted to determine the basic assisting drive torque or energy which is a predetermined percentage of the required vehicle drive torque as represented by the operating angle θ of the accelerator pedal 36 and its rate of change dθ/dt, so that the determined basic assisting drive torque is generated in a pattern indicated in FIG. 6 or 9. Accordingly, both of the primary drive torque generated by the engine 10 and the assisting drive torque generated by the MG 28 are determined by the operator's desired total vehicle output, such that the primary and assisting drive torque values have a predetermined ratio.

It will be understood that the determining means 70 and 80 cooperate to serve as assisting drive torque control means for operating the primary drive power source in the form of the engine 10 to generate a primary drive torque on the basis of a total output of the vehicle desired by the vehicle operator, and simultaneously operating the auxiliary drive power source in the form of the MG 28 such that an assisting drive torque generated by the auxiliary drive power source is a predetermined percentage of the primary drive torque of the primary drive power source.

The first assisting drive torque compensating means 72 and the second assisting drive torque compensating means 82 are adapted to compensate the basic assisting drive torque so that the actual operating point (indicated by the circle in FIG. 7) of the engine 10 before generation of the assisting drive torque by the MG 28 is moved to the calculated point (indicated by the square in FIG. 7) lying on the above-indicated maximum fuel economy curve after the generation of the assisting drive torque. Thus, the compensating means 72, 82 compensate the operation of the MG 28 on the basis of the energy consuming state of the engine 10 after the initiation of operation of the MG 28.

It will be understood that the compensating means 72, 82 cooperate to serve as fourth or auxiliary drive power source control means for controlling the operation of the auxiliary drive power source in the form of the MG 28 so as to optimize a percentage of the assisting drive torque with respect to the primary drive torque, on the basis of the energy consuming state of the primary drive power source in the form of the engine 10 after the initiation of operation of the auxiliary drive power source.

The above-indicated engine output limiting means 84 of the engine/transmission control device 38 is adapted to calculate a desired acceleration value $G_M$ of the vehicle on the basis of the operator's desired total vehicle output and according to a predetermined relationship between the desired acceleration value $G_M$ and the operator's desired total vehicle output. The engine output limiting means 84 is further adapted to obtain the actual acceleration value G of the vehicle, and control the opening angle $\theta_{TH}$ of the throttle valve 41 such that the actual acceleration value G does not exceed the desired value $G_M$, whereby the output of the engine 10 is limited.

It will be understood that this engine output limiting means 84 serves as third control means for reducing the output of the engine 10 with an increase in the assisting drive torque generated by the MG 28, while the high-$\mu$ roadway surface determining means serving as roadway surface friction coefficient determining means determines that the friction coefficient of the roadway surface is comparatively high.

First POWER MODE selection determining means 86 is provided to determine whether the vehicle is placed in a POWER mode in which the vehicle is driven with relatively high drivability. This determination is made depending upon whether the POWER MODE selector switch 56 is on or not.

The first POWER MODE selection determining means 86 is connected to engine output limitation inhibiting means 88, which is adapted to inhibit an operation of the engine output limiting means 84 to limit the output of the engine 10, while the first POWER MODE selection determining means 86 determines that the vehicle is placed in the POWER mode. Thus, the engine output limitation inhibiting means 88 serves to increase the vehicle acceleration or the vehicle drive force.

It will be understood that the fuel-saving assisting drive torque control means 68, the accelerating assisting drive torque control means 78, the engine output limiting means 84, the POWER MODE selection determining means 86 and the engine output limitation inhibiting means 88 cooperate to serve as fifth or energy supply control means for controlling the auxiliary drive power source in the form of the MG 28 to produce an assisting drive torque while limiting the output of the primary drive power source in the form of the engine 10, in the fuel-saving mode or vehicle accelerating mode, while the operator's desired vehicle output is comparatively small and while the vehicle is not placed in the POWER mode, and for operating the auxiliary drive power source for a relatively short time to produce a relatively large assisting drive torque while mitigating or reducing the output limitation of the primary drive power source, while the operator's desired vehicle output is comparatively large and while the vehicle is placed in the POWER mode.

The motor control device 46 further includes first insufficient energy amount direct assisting drive torque control means 90 (hereinafter referred to as "first IEADADTC means 90") operable when the first stored energy amount determining means 66 or the second stored energy amount determining means 74 has determined that the residual energy amount SOC stored in the capacitor 48 is smaller than the threshold $SOC_o$. The first IEADADTC means 90 is adapted to supply an electric energy generated by the electric generator 24 driven by the engine 10, directly to the MG 28, with the speed $N_E$ of the engine 10 being positively raised by a suitable amount by a shift-down action of the transmission 14 or a releasing action of the lock-up clutch of the torque converter 12, when the operating amount $A_{cc}$ of the accelerator pedal 36 is increased by the vehicle operator to accelerate the vehicle. As a result, a comparatively large assisting drive torque is generated by the MG 28 operated as the electric motor.

The motor control device 46 further includes second POWER MODE selection determining means 92 which is also operable when the first or second stored energy amount determining means 66, 74 has determined that the residual energy amount SOC stored in the capacitor 48 is smaller than the threshold $SOC_o$. The second POWER MODE selection determining means 92 is adapted to determine whether the vehicle is placed in the POWER mode explained above. The POWER MODE selection determining means 92 is connected. to assisting retarding means 94, which is operable when the determining means 92 has determined that the POWER mode is selected. The assisting retarding means 94 is adapted to retard the moment of initiation of an assisting operation of the first IEADADTC means 90 by a predetermined time after the moment at which the operating amount $A_{cc}$ of the accelerator pedal 36 is increased.

It will be understood that the POWER MODE selection determining means 92 and the assisting retarding means 94 cooperate to serve as eighth or auxiliary drive power source control means operable when the electric energy is supplied from the energy generating means in the form of the electric generator 34 driven by the primary drive power source in the form of the engine 10, to the auxiliary drive power source in the form of the MG 28. The eighth control means retards the moment of initiation of an operation of the auxiliary drive power source with the electric energy supplied from the energy generating means, by a predetermined time after the moment of an operation by the vehicle operator to increase the required output of the vehicle, when the vehicle is placed in the POWER mode, and permits the operation of the auxiliary drive power source to be initiated at the moment of the vehicle operator's operation to increase the required vehicle output, when the vehicle is not placed in the POWER mode.

The motor control device 46 further includes highly-accelerating assisting drive torque control means 96 operable when the required output determining means 64 has determined that the required output of the vehicle is large.

Figure 11:
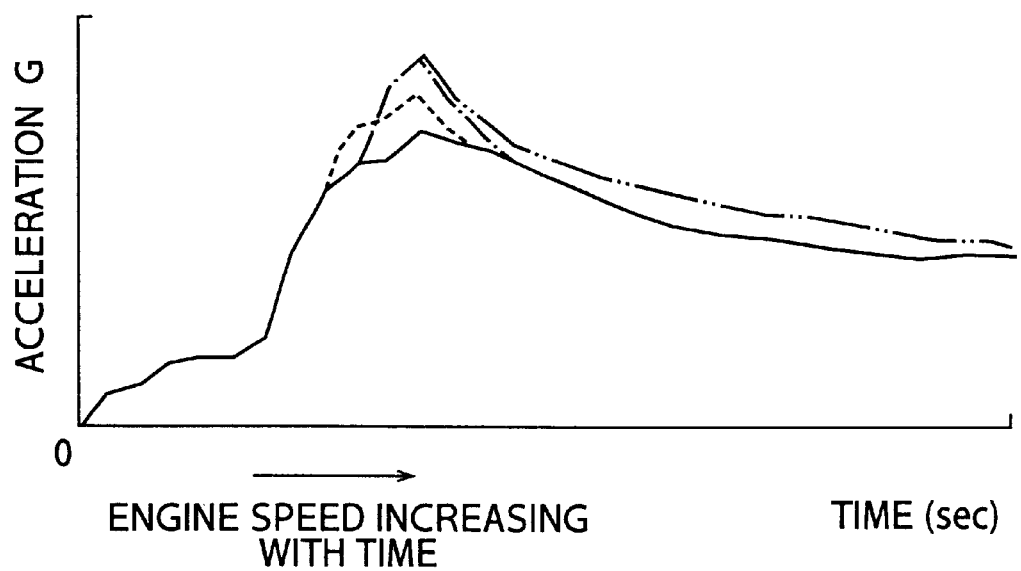
FIG. 11 is a graph showing changes of an acceleration G of the vehicle when the assisting drive torque is generated under the control of highly-accelerating assisting drive torque control means shown in FIG. 4.

The highly-accelerating assisting drive torque control means 96 is adapted to initiate the supply of the electric energy generated by the electric generator 24 driven by the engine 10, directly to the MG 28 a predetermined time after the moment of initiation of an operation of the accelerator pedal 36. When the acceleration G of the vehicle has almost reached a maximum value, the highly-accelerating assisting drive torque control means 96 initiates the supply of the electric energy from the capacitor 48 to the MG 28, and holds this supply for about two to three seconds. As a result of the direct supply of the electric energy from the generator 24 to the MG 28 and the supply of the electric energy from the capacitor 48 to the MG 28, the acceleration G of the vehicle changes as indicated by two-dot chain line in FIG. 11. Solid line in FIG. 11 represents a change of the acceleration G when the vehicle is accelerated by operation of the engine 10 only. One-dot chain line in FIG. 11 represents a change of the acceleration G when the vehicle is accelerator by the engine 10 and the MG 28 operated with the electric energy supplied from the electric generator 24 only. Where the supply of the electric energy from the generator 24 directly to the MG 28 is initiated upon the vehicle operator's operation to accelerate the vehicle, the output torque of the engine 10 is consumed solely for raising the speed $N_E$ of the engine 10, and the assisting drive torque generated by the MG 28 does not significantly contribute to an increase in the vehicle acceleration G. As the engine speed $N_E$ approaches a maximum value corresponding to the operating angle θ of the accelerator pedal 36, the acceleration G relatively rapidly increases. When the acceleration G by the output of the engine 10 has increased to a maximum value, the assisting drive torque generated by the MG 28 with the electric energy from the generator 24 significantly contributes to an increase in the acceleration G, as indicated by broken line in FIG. 11. Subsequently, this contribution disappears. Where the generation of the assisting drive torque by the MG 28 with the electric energy from the generator 24 is initiated a predetermined time after the moment of initiation of the vehicle accelerating operation of the accelerator pedal 36, that is, initiated after the engine speed NE has been sufficiently raised by the entire output torque of the engine 10 without consumption of any portion of its output torque by the generator 24, the generation of the assisting drive torque by the MG 28 is retarded, so that the peak of the acceleration G is increased. In addition, the electric energy is applied from the capacitor 48 to the MG 28 when the vehicle acceleration G has reached the peak, so that the vehicle acceleration G is held at a relatively high value for a relatively long time, as indicated by the two-dot chain line in FIG. 11, whereby the vehicle is accelerated for a long time.

It will be understood that the highly-accelerating assisting drive torque control means 96 serves as ninth or energy supply control means operable when a vehicle operator's operation is performed to accelerate the vehicle. The ninth control means first initiates a supply of an electric energy generated by energy generating means in the form of the electric generator 24 driven by the primary drive power source in the form of the engine 10, to the auxiliary drive power source in the form of the MG 28, and then initiates a supply of an electric energy stored in energy storing means in the form of the capacitor 48 to the auxiliary drive power source, when a predetermined time has passed after the moment of initiation of the supply of the energy from said energy generating means to the auxiliary drive power source.

The motor control device 48 further includes insufficient acceleration determining means 98 for determining whether the acceleration G of the vehicle is insufficient or not. To make this determination, a desired acceleration value $G_M$ of the vehicle is calculated on the basis of the detected required vehicle output and according to a predetermined relationship between the required vehicle output and the desired acceleration value $G_M$. The actual vehicle acceleration value G is obtained from a change of the vehicle running speed V. The determining means 98 determines that the actual acceleration value G is insufficient, when the obtained actual acceleration value G is lower than the calculated desired value $G_M$.

The motor control device 46 further includes accelerating assisting drive torque compensating means 100 which is operated in place of the highly-accelerating assisting drive torque control means 96, when the insufficient acceleration determining means 98 has determined that the vehicle acceleration G is insufficient. The compensating means 100 controls the amount of the electric energy from the capacitor 48 to the MG 28, such that the assisting drive torque generated by the MG 28 is larger than that generated under the control of the accelerating assisting drive torque control means 78, so that the desired acceleration value $G_M$ is established.

The motor control means further includes insufficient acceleration direct assisting drive torque control means 102 (hereinafter referred to as "IADADTC" means 102") operable when the actual acceleration value G is still insufficient, or the desired acceleration value $G_M$ cannot be obtained, even with the assisting drive torque compensated by the accelerating assisting drive torque compensating means 100. The IADADTC means 102 supplies the electric energy from the generator 24 directly to the MG 28, in addition to the electric energy from the capacitor 48.

It will be understood that the fuel-saving assisting drive torque control means 68, the accelerating assisting drive torque control means 78, the highly-accelerating assisting drive torque control means 96, the insufficient acceleration determining means 98, the accelerating assisting drive torque compensating means 100 and the IADADTC means 102 cooperate to serve as sixth or energy supply control means for supplying an electric energy stored in the energy storing means in the form of the capacitor 48 to the auxiliary drive power source in the form of the MG 28, so as to generate a relatively small assisting drive torque, when the required vehicle output is not so large; and supplying not only the electric energy stored in the energy storing means but also the electric energy generated by the energy generating means in the form of the generator 24 driven by the primary drive power source in the form of the engine 10, to the auxiliary drive power source, when the required vehicle drive force is large, for instance, when the vehicle is climbing an uphill or is running with a large load and cannot be accelerated as desired. In the latter case, the sixth control means controls the operation of the auxiliary drive power source such that the auxiliary drive power source is operated for a shorter time and so as to produce a larger output or larger assisting drive torque, than when the required vehicle output is small, that is, than when the fuel-saving assisting drive torque control means 68 is operated.

Figure 12:
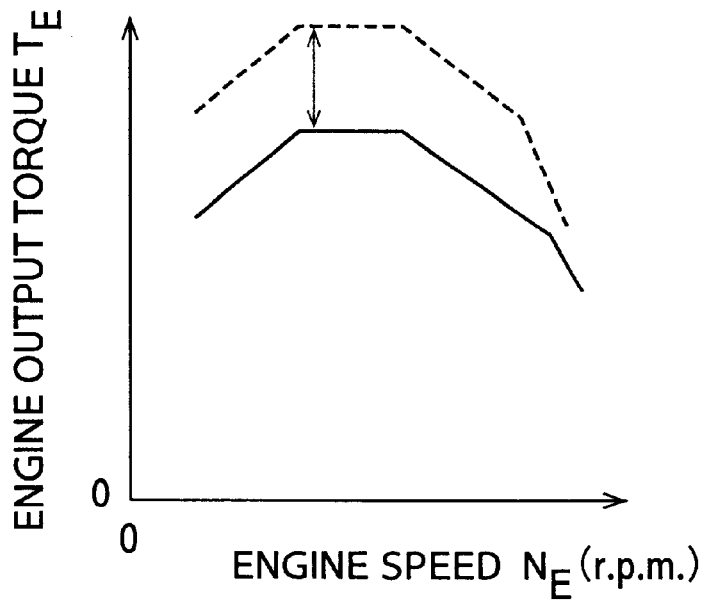
FIG. 12 is a graph showing an engine output torque $T_E$ which is reduced due to an operation of the motor generator, when the assisting drive torque is generated under the control of direct assisting drive torque control means shown in FIG. 4.
Figure 13:
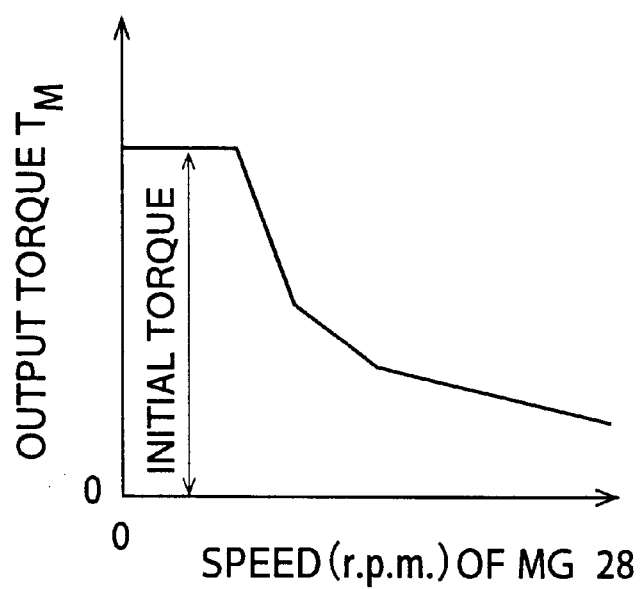
FIG. 13 is a graph for explaining a torque characteristic of the motor generator when controlled by the direct assisting drive torque control means, namely, a large initial assisting drive torque of the motor generator.

In the various direct assisting drive torque controls effected by supplying the electric energy from the generator 24 directly to the MG 28 as described above, a portion of the output of the engine 10 is consumed by the generator 24, and the drive force of the front wheels 20 is reduced, but the rear wheels 34 are driven by the assisting drive torque generated by the MG 28 operated as the electric motor or auxiliary drive power source. When the vehicle is started, the assisting drive torque generated by the MG 28 is larger than the amount by which the drive torque generated by the engine 10 is reduced to the partial consumption of the engine output by the generator 24. In this respect, it is noted that the MG 28 has a torque characteristic that the torque produced is larger when the operating speed is relatively high than when it is relatively low. Therefore, the supply of the electric energy from the generator 24 to the MG 28 has substantially the same effect as the supply of the electric energy from the capacitor 48 to the MG 28. The graph of FIG. 12 shows characteristics of the output torque $T_E$ of the engine 10. More specifically described, broken line in FIG. 12 indicates a change of the output torque $T_E$ with the engine speed $N_E$ before the electric energy is supplied from the generator 24 directly to the MG 28, while solid line in FIG. 12 indicates a change of the same after the supply of the electric energy. A difference between the engine torque values $T_E$ indicated by the broken and solid lines corresponds to an amount of reduction of the drive force of the front wheels 20 due to the partial consumption of the engine output by the electric generator 24 to supply the electric energy to the MG 28 to produce an assisting drive torque. The graph of FIG. 13 shows a characteristic of the output torque $T_M$ of the MG 28 wherein the initial torque when the speed of the MG 28 is close to zero is comparatively large.

The motor control device 46 further includes accelerator operation determining means 106 for determining whether the accelerator pedal 36 is operated to accelerate the vehicle. This determination is effected on the basis of an amount of change of the operating angle θ of the accelerator pedal 36 or a rate of change dθ/dt of the operating angle θ. To the accelerator operation determining means 106, there is connected low-μ roadway assisting drive torque control means 108, which determines a basic assisting drive torque value or energy, which is a predetermined percentage of the required total vehicle drive torque determined by the operating angle θ or rate of change dθ/dt. The low-μ roadway assisting drive torque control means 108 controls the amount of electric energy supplied from the capacitor 48 to the MG 28 so that the vehicle is suitably started or accelerated. Preferably, the control means 108 controls the supply of the electric energy from the capacitor 48 to the MG 28 such that a constant assisting drive torque is generated by the MG 28 for a comparatively long time while the required total vehicle drive torque is small, as in the assisting drive torque controls by the fuel-saving assisting drive torque control means 68 and the accelerating assisting drive torque control means 70, and such that a larger assisting drive torque is generated by the MG 28 for a comparatively short time while the required total vehicle drive torque is medium or large. That is, the low-μ roadway assisting drive torque control means 108 control the operation of the MG 28 such that the assisting drive torque generated by the MG 28 increases with the required total vehicle drive torque or force and such that the length of operation of the MG 28 decreases with the required total vehicle drive torque.

The motor control device 46 further includes third stored energy amount determining means 110, which like the first and second stored energy amount determining means 66, 74, determines whether the residual energy amount SOC stored in the capacitor 48 is larger than the threshold $SOC_o$ or not. To the third stored energy amount determining means 110, there is connected second insufficient energy amount direct assisting drive torque control means 112 (hereinafter referred to as "second IEADADTC means 112") operable when the determining means 110 has determined that the residual energy amount SOC stored in the capacitor 48 is insufficient, namely, smaller than the threshold $SOC_o$. The second IEADADTC means 112 supplies an electric energy generated by the generator 24 driven by the engine 24 directly to the MG 28 to produce an additional assisting drive torque, in addition to an assisting drive torque produced with the electric energy supplied from the capacitor 48 under the control of the low-μ roadway assisting drive torque control means 108.

The engine/transmission control device 38 includes the speed ratio compensating means 114 indicated above, which changes the speed ratio of the transmission 14 so as to increase the vehicle drive force. For instance, the speed ratio compensating means 114 shifts down the transmission 14 or release the lock-up clutch of the torque converter 12, so as to increase the drive force of the rear wheels 34 by an amount larger than the amount of reduction of the drive force of the front wheels 20, while the vehicle speed V is medium or low. While the vehicle speed V is high, the speed ratio compensating means 114 shifts down the transmission 14 so as to increase the vehicle acceleration G to a value to be obtained when the low-μ roadway assisting drive torque control means 108 is operated.

It will be understood that the second IEADADTC means 112 and the speed ratio compensating means 114 cooperate to serve as seventh or energy supply control means operable when the third stored energy amount determining means 110 has determined that the residual energy amount SOC of the capacitor 48 is insufficient or smaller than a predetermined threshold. The seventh control means supplies an electric energy from the energy generating means in the form of the generator 24 driven by the primary drive power source in the form of the engine 10, to the auxiliary drive power source in the form of the MG 28, and increases the speed ratio of the transmission 14 provided for the primary drive power source, so as to increase the vehicle drive force.

To the low-μ roadway assisting drive torque control means 108, there is connected wheel slip determining means 118 for determining whether the front wheels 20 driven by the engine 10 are slipping. This determination is made by determining whether the slip speed ΔV of the front wheels 20 which is a difference between the average rear wheel speed $V_R$ and the average front wheel speed $V_F$ has exceeded a predetermined threshold value. To the wheel slip determining means 118, there is connected low-μ roadway direct assisting drive torque control means 120 operable when the wheel slip determining means 118 has determined that the front wheels 30 are slipping. The low-i roadway direct assisting drive torque control means 120 supplies an electric energy generated by the generator 24 driven by the engine 10 directly to the MG 28, for producing an additional assisting drive torque, in addition to the assisting drive torque based on the electric energy supplied from the capacitor 48 under the control of the low-μ roadway assisting drive torque control means 108.

The engine/transmission control device 38 includes the low-μ roadway engine output limiting means 122 indicated above, which is operated when the direct assisting drive torque control by the low-μ roadway direct assisting drive torque control means 120 is initiated. The low-μ roadway engine output limiting means 122 is adapted to limit the output of the engine 10 and the drive force of the front wheels 20, and control the operation of the MG 28 to drive the rear wheels 34. The output of the engine 10 is limited by controlling at least one of the opening angle $θ_{TH}$ of the throttle valve 41, the amount of fuel injection into the engine 10, the ignition timing of the engine 10 and the front brakes 44. Accordingly, the slipping tendency of the front wheels 20 is reduced. In the direct assisting drive torque control, a portion of the output of the engine 10 is consumed by the generator 24, and the drive force of the front wheels 20 is accordingly reduced, while at the same time the MG 28 is operated with the electric energy supplied from the generator 24, to drive the rear wheels 34. In the present embodiment, the engine output limiting means 122 is provided to positively limit the output of the engine, so that the total drive force of the vehicle is increased while the front wheels 20 are slipping.

It will be understood that the low-$\mu$ roadway direct assisting drive torque control means 120 and the low-$\mu$ roadway engine output limiting means 122 cooperate to serve as second control means operable when the wheel slip determining means 118 has determined that the friction coefficient $\mu$ of the roadway surface is so low that the front wheels 20 are slipping. The second control means is adapted to limit or reduce the output of the primary drive power source in the form of the engine 10 while operating the auxiliary drive power source in the form of the MG 28.

Figure 14:
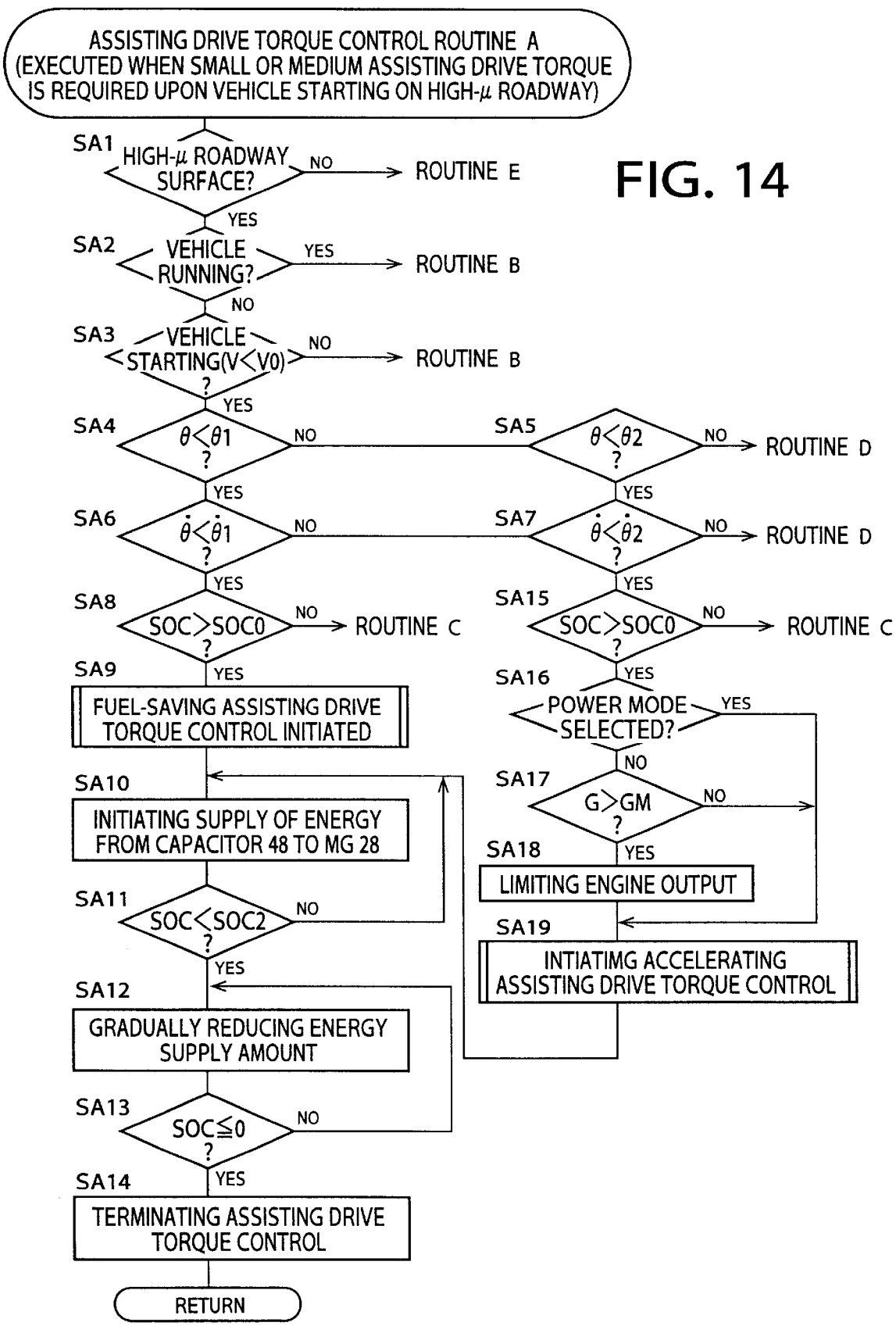
FIG. 14 is a flow chart illustrating an assisting drive torque control routine A executed by the motor control device when a small or medium assisting drive torque is required upon starting of the vehicle on a high-$\mu$ roadway surface.
Figure 15:
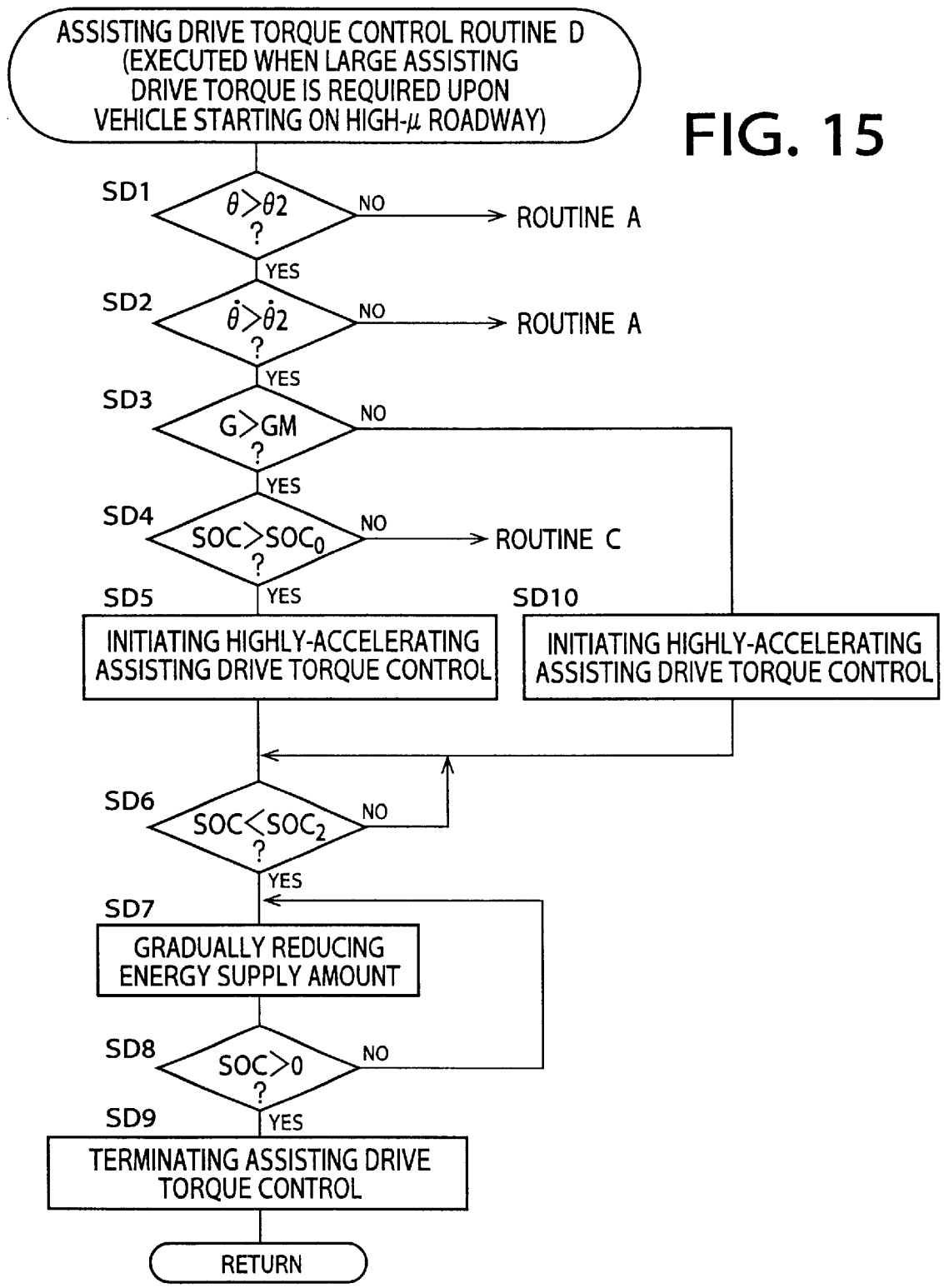
FIG. 15 is a flow chart illustrating an assisting drive torque control routine D executed by the motor control device when a large assisting drive torque is required upon starting of the vehicle on the high-$\mu$ roadway surface.
Figure 16:
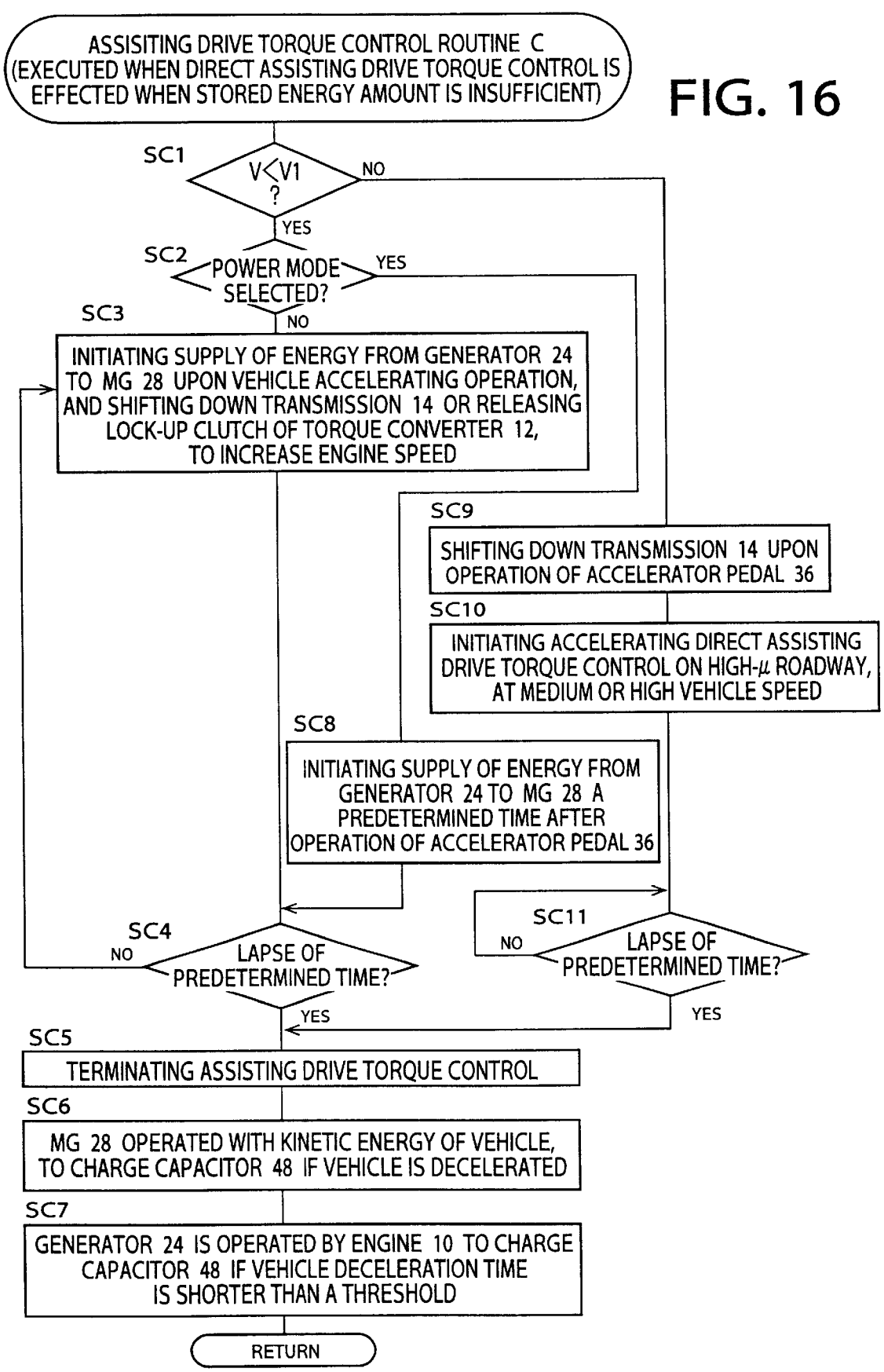
FIG. 16 is a flow chart illustrating an assisting drive torque control routine C executed by the motor control device when the direct assisting drive control means is operated when a residual electric energy in the capacitor is insufficient.
Figure 17:
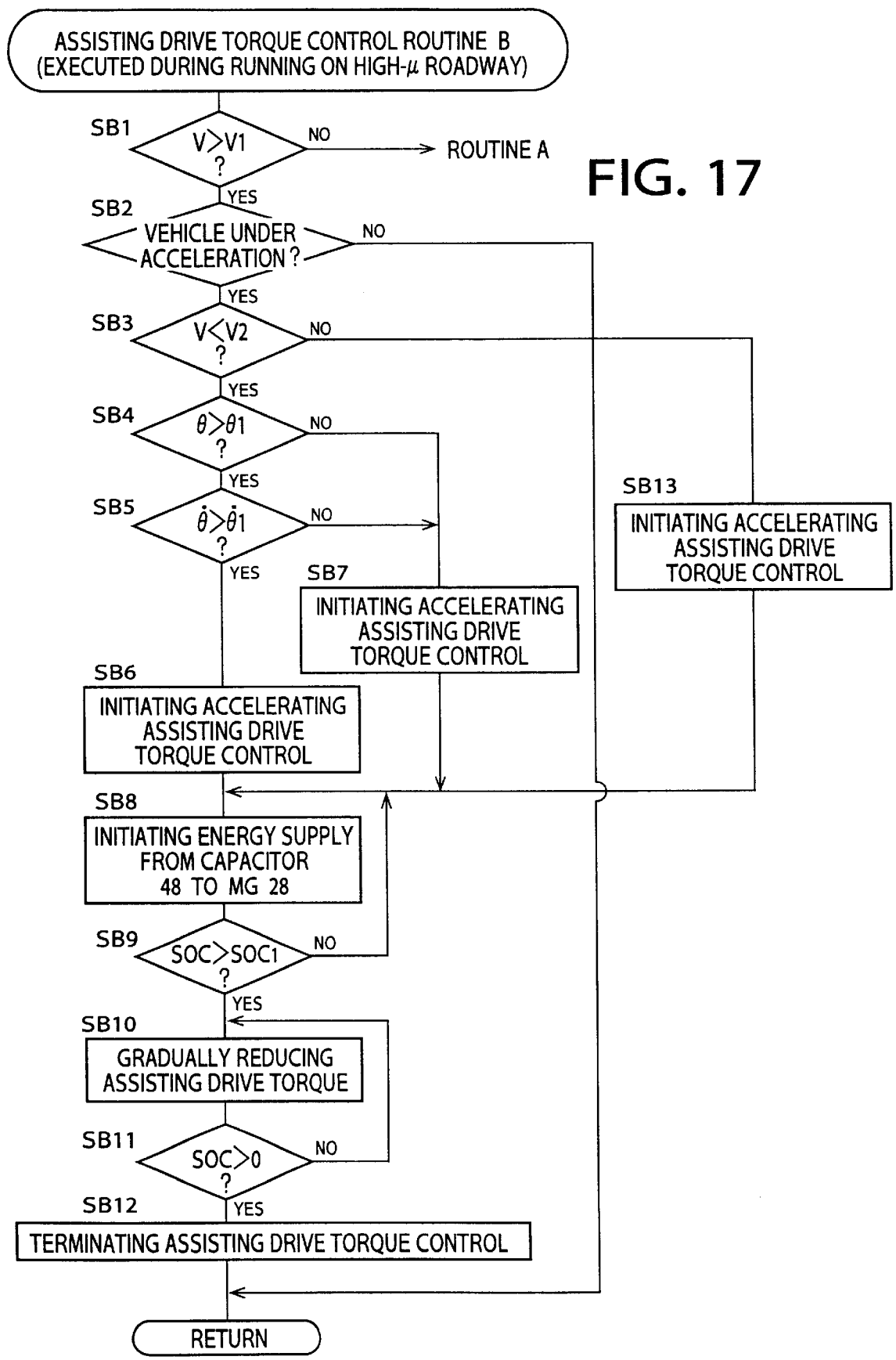
FIG. 17 is a flow chart illustrating an assisting drive torque control routine B executed by the motor control device when the vehicle is running on the high-$\mu$ roadway surface.
Figure 18:
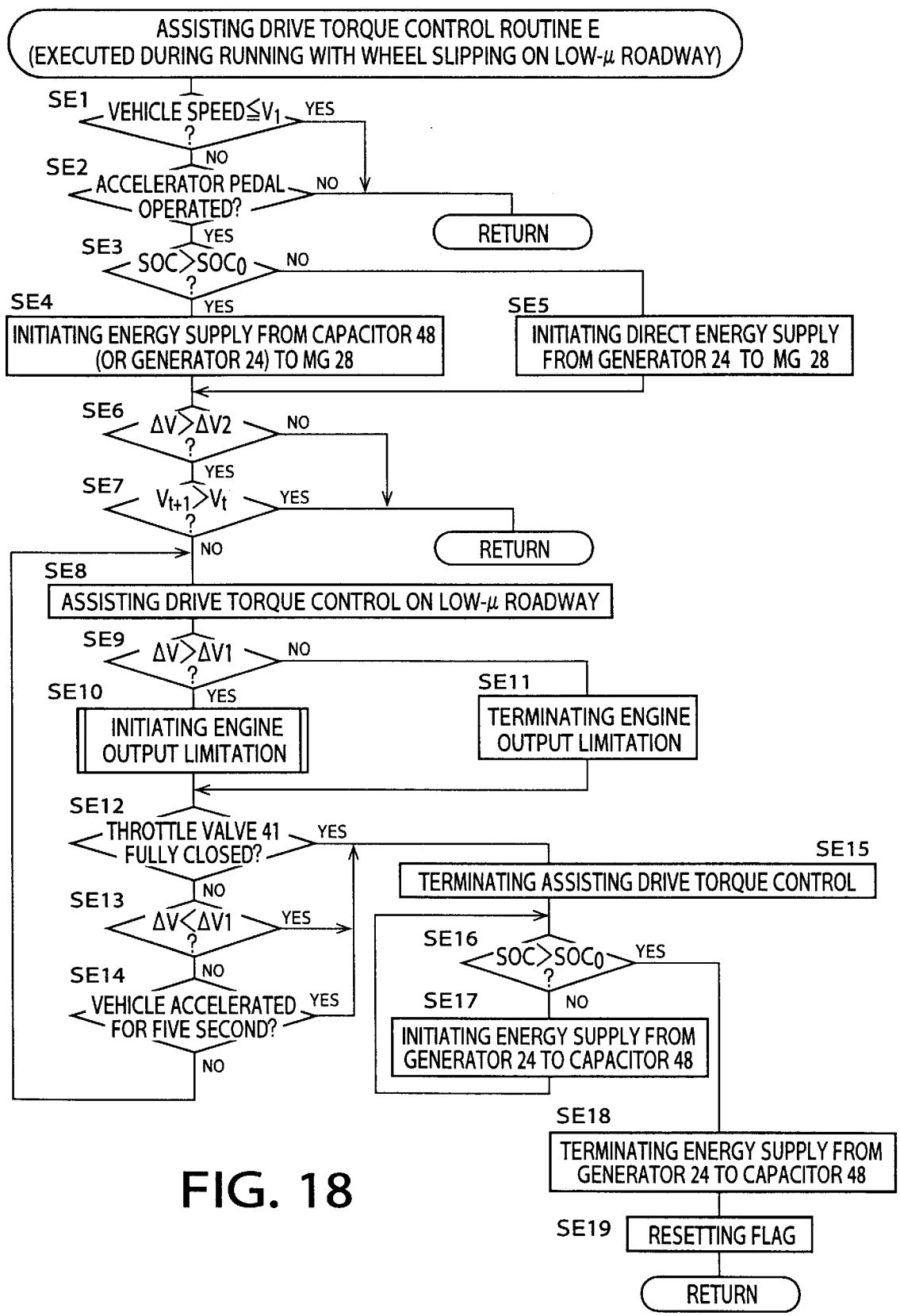
FIG. 18 is a flow chart illustrating an assisting drive torque control routine E executed by the motor control device when the vehicle is running with wheel slipping on the low-$\mu$ roadway surface.

Referring to the flow charts of FIGS. 14–18, there will be respectively described various assisting drive torque control routines A, D, C, B and E, which are executed by the motor control device 46 and the engine/transmission control device 38, the functional means of which have been described above. The flow chart of FIG. 14 illustrates an assisting drive torque control routine A executed when a small or medium assisting drive torque is required upon starting of the vehicle on a high-$\mu$ roadway surface. The flow chart of FIG. 15 illustrates an assisting drive torque control routine D executed when a large assisting drive torque is required upon starting of the vehicle on a high-$\mu$ roadway surface. The flow chart of FIG. 16 illustrates an assisting drive torque control routine C executed when a direct assisting drive torque control is effected when the residual electric energy amount SOC in the capacitor 48 is insufficient. The flow chart of FIG. 17 illustrates an assisting drive torque control routine B executed when the vehicle is running on the high-$\mu$ roadway surface. The flow chart of FIG. 18 illustrates an assisting drive torque control routine E executed when the vehicle is running with the front drive wheels 20 slipping on a low-$\mu$ roadway surface.

The assisting drive torque control routine A of FIG. 14 is initiated with step SA1 corresponding to the high-$\mu$ roadway surface determining means 60, to determine whether the roadway surface on which the vehicle lies has a friction coefficient p high enough to be considered to be a dry surface. This determination is effected on the basis of the slipping state of the front drive wheels 20 (primary drive wheels) while the vehicle is accelerated or started. If an affirmative decision (YES) is obtained in step SA1, the control flow goes to step SA2 to determine whether the vehicle is running at a speed not lower than the lower limit Vx1. That is, the determination in step SA2 is based on the running speed V of the vehicle. If a negative decision (NO) is obtained in step SA2, the control flow goes to step SA3 to determine whether the detected running speed V is lower than a predetermined threshold V0, namely, whether the vehicle has been just started. Steps SA2 and SA3 correspond to the vehicle state determining means 62.

If an affirmative decision (YES) is obtained in step SA3, the control flow goes to steps SA4, SA5, SA6 and SA7 corresponding to the required output determining means 64, for determining the required output of the vehicle presently desired by the vehicle operator, namely, for determining whether the required vehicle output is small, medium or large. This determination is based on the operating angle $\theta$ of the accelerator pedal 36 and the rate of change $d\theta/dt$ of the operating angle $\theta$. Described more specifically, step SA4 is provided to determine whether the operating angle $\theta$ is smaller than a threshold $\theta 1$ or not. If a negative decision (NO) is obtained in step SA4, the control flow goes to step SA5 to determine whether the operating angle $\theta$ is smaller than a smaller than a threshold $\theta 2$ which is larger than the threshold $\theta 1$. If an affirmative decision (YES) is obtained in step SA4, the control flow goes to step SA6 to determine whether the rate of change $d\theta/dt$ is lower than a threshold $d\theta 1/dt$ or not. If a negative decision (NO) is obtained in step SA6, or if an affirmative decision (YES) is obtained in step SA5, the control flow goes to step SA7 to determine whether the rate of change $d\theta/dt$ is lower than a threshold $d\theta 2/dt$ which is higher than the threshold $d\theta 1/dt$.

Figure 19:
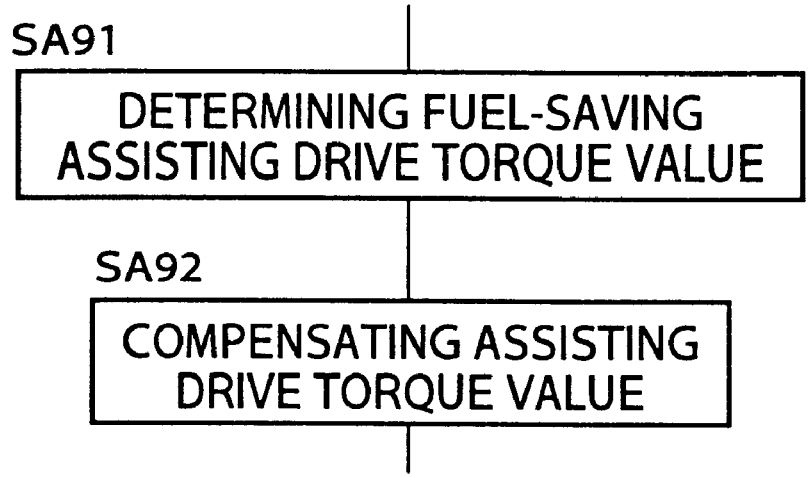
FIG. 19 is a view showing a fuel-saving assisting drive torque control in step SA9 in the control routine A of FIG. 14.

If the affirmative decision (YES) is obtained in steps SA4 and SA6, it means that the presently required output of the vehicle is small as in a city running mode (mode 10 or mode 15). In this case, the control flow goes to step SA8 corresponding to the first stored energy amount determining means 66, to determine whether the residual amount SOC of the electric energy in the capacitor 48 is larger than the threshold $SOC_o$ or not. If an affirmative decision (YES) is obtained in step SA8, the control flow goes to step SA9 corresponding to the fuel-saving assisting drive torque control means 68, wherein a fuel-saving assisting drive torque control routine as illustrated in FIG. 19 by way of example is executed to permit the vehicle to be started with acceleration corresponding to the relatively small required vehicle output. In the fuel-saving assisting drive torque control routine of FIG. 19, step SA91 corresponding to the fuel-saving assisting drive torque determining means 70 is implemented to calculate the basic assisting drive torque value (fuel-saving assisting drive torque value) which is a predetermined percentage (e.g., about 20%) of the required drive torque corresponding to the presently required vehicle output which is determined on the basis of the operating angle $\theta$ of the accelerator pedal 36 and its rate of change $d\theta/dt$ and according to a predetermined relationship between the required vehicle output and the values $\theta$ and $d\theta/dt$. Step SA91 is further formulated to determine the pattern of the assisting drive torque as indicated in FIG. 6 by way of example, in which the assisting drive torque generated by the MG 28 is held constant at the calculated basic assisting drive torque value for a length of time as long as possible. Step SA91 is followed by step SA92 corresponding to the first assisting drive torque compensating means 72, to compensate the basic assisting drive torque value so that the actual operating point (indicated by the circle in FIG. 7) of the engine 10 in the two-dimensional coordinate system of FIG. 7 before generation of the assisting drive torque by the MG 28 is moved to a calculated point (indicated by the square in FIG. 7) lying on the maximum fuel economy curve after the generation of the assisting drive torque.

Step SA9 is followed by step SA10 in which the electric energy stored in the capacitor 48 is supplied to the MG 28 such that the constant assisting drive torque obtained by compensation by the compensating means 72 is generated by the MG 28, for the possible longest time, namely, up to the point of time $t_N$ indicated in FIG. 7. Then, the control flow goes to step SA11 to determine whether the residual energy amount SOC stored in the capacitor 48 is larger than the gradual torque reducing energy amount SOC2 (indicated in FIG. 6). If a negative decision (NO) is obtained in step SA11, it means that any portion of the accelerating energy amount SOC1 is left in the capacitor 48, and the control flow goes back to step SA10. Steps SA10 and SA11 are repeatedly implemented until the accelerating energy amount SOC1 has been entirely consumed, so that the constant assisting drive torque is generated by the MG 28. When the entirety of the accelerating energy amount SOC1 has been consumed, an affirmative decision (YES) is obtained in step SA11, and the control flow goes to step SA12 in which the gradual reduction of the amount of energy to be suppled from the capacitor 48 to the MG 28 is initiated at the point of time $t_N$, so that the energy supplied to the MG 28 is gradually reduced, as indicated in FIG. 6. Then, step SA13 is implemented to determine whether the gradual torque reducing energy amount SOC2 has been reduced to zero, namely, whether the entire amount of the electric energy originally stored in the capacitor 48 has been consumed. Steps SA12 and SA13 are repeatedly implemented as long as any amount of energy is left in the capacitor 48. If an affirmative decision (YES) is obtained in step SA13, the control flow goes to step SA14 in which the operation of the MG 28 to produce the assisting drive torque is terminated.

When the required output of the vehicle desired by the vehicle operator is medium, the negative decision (NO) is obtained in step SA4 while the affirmative decision (YES) is obtained in both steps SA5 and SA7, or alternatively, the negative decision (NO) is obtained in step SA6 while the affirmative decision (YES) is obtained in step SA7. In this case, the control flow goes to step SA15 corresponding to the second stored energy amount determining means 74, to determine whether the residual energy amount SOC is larger than the threshold $SOC_o$. If an affirmative decision (YES) is obtained in step SA15, the control flow goes to step SA16 corresponding to the first POWER MODE selection determining means 86 and engine output limitation inhibiting means 88, to determine whether the POWER MODE selector switch 56 is on, that is, whether the POWER mode has been selected, that is, whether the vehicle is placed in the POWER mode in which the transmission 14 is controlled so as to improve the drivability of the vehicle.

If a negative decision (NO) is obtained in step SA16, the control flow goes to steps SA17 and SA18 corresponding to the engine output limiting means 84, to limit the output of the engine 10 such that the actual acceleration G of the vehicle does not exceed the desired value $G_M$ determined by the actual operating angle θ of the accelerator pedal 36. That is, step SA17 is implemented to determine whether the actual acceleration G has exceeded the desired value $G_M$. Step SA18 is not implemented until an affirmative decision (YES) is obtained in step SA17. When the affirmative decision is obtained in step SA17, the control flow goes to step SA18 in which the output of the engine 10, that is, the drive force of the front wheels 20 is automatically limited or reduced by controlling at least one of the opening angle $\theta_{TH}$ of the throttle valve 41, the amount of fuel injection into the engine 10 and the front brakes 44, so that the actual acceleration G of the vehicle is reduced to the desired value $G_M$. Described in detail, the throttle opening angle $\theta_{TH}$ or the fuel injection amount is reduced from the value corresponding to the operating angle θ or amount $A_{cc}$ of the accelerator pedal 36, by an amount which increases with an increase in the assisting drive torque generated by the MG 28. Thus, the output of the engine 10 is reduced with an increase in the assisting drive torque generated by the MG 28. If an affirmative decision (YES) is obtained in step SA16, the control flow goes to step SA19 while skipping the above-indicated steps SA17 and SA18. It will therefore be understood that steps SA16 corresponds to the engine output limitation inhibiting means 88 for inhibiting the engine output limiting means 84 from limiting the output of the engine 10 and thereby assuring a relatively high value of acceleration G of the vehicle and an accordingly large drive force of the front wheels 20, when the vehicle is placed in the POWER mode.

Figure 20:
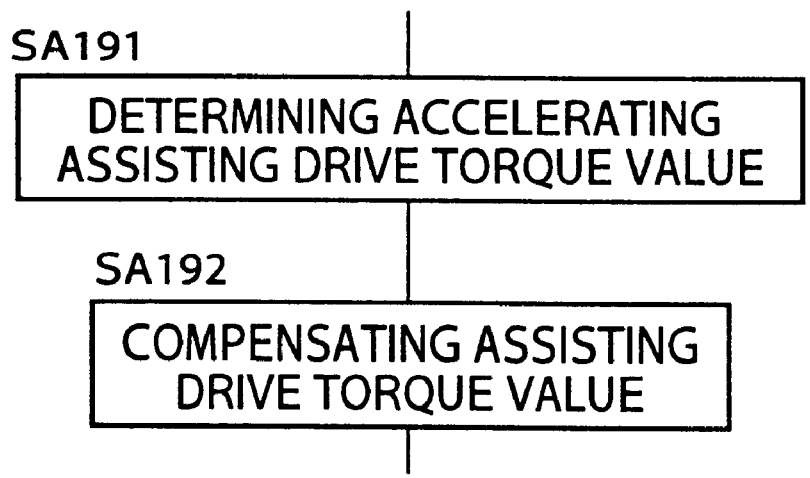
FIG. 20 is a view showing an accelerating assisting drive torque control in step SA19 in the control routine A of FIG. 14.

Step SA18 is followed by step SA19 corresponding to the accelerating assisting drive torque control means 78, in which an accelerating assisting drive torque control routine illustrated in the flow chart of FIG. 20 by way of example is executed. In this control routine of FIG. 20, step SA191 corresponding to the accelerating assisting drive torque determining means 80 is implemented to determine the basic assisting drive torque value or basic assisting energy value which is a predetermined percentage of the required vehicle drive torque corresponding to the required vehicle output which is determined by the operating angle θ of the accelerator pedal 36 and its rate of change dθ/dt. Step SA191 is further formulated to determine the pattern of the assisting drive torque as indicated in FIG. 9 by way of example, in which the assisting drive torque generated by the MG 28 is larger than that determined in step SA91 and is kept generated for a length of time as short as possible. Step SA191 is followed by step SA192 corresponding to the second assisting drive torque compensating means 82, to compensate the basic assisting drive torque value so that the actual operating point (indicated by the circle in FIG. 7) of the engine 10 before generation of the assisting drive torque by the MG 28 is moved to a calculated point (indicated by the square in FIG. 7) lying on the maximum fuel economy curve after the generation of the assisting drive torque. In step SA19 corresponding to the accelerating assisting drive torque control means 78, the assisting drive torque generated by the MG 28 is made larger and is kept generated for a shorter length of time, when the affirmative decision (YES) is obtained in step SA16, than when step SA19 is implemented following step SA18.

If the negative decision (NO) is obtained in step SA5 or step SA7, that is, if the required vehicle output desired by the operator is large, the control flow goes to the assisting drive torque control routine D illustrated in the flow chart of FIG. 15. This control routine D is formulated for controlling the assisting drive torque when a relatively large assisting drive torque is required upon starting of the vehicle on the dry roadway surface. The control routine D is initiated with step SD1 to determine whether the operating angle θ of the accelerator pedal 36 is larger than the threshold θ2. If an affirmative decision (YES) is obtained in step SD1, the control flow goes to step SD2 to determine whether the rate of change dθ/dt is higher than the threshold dθ2/dt. The threshold θ2 is a lower limit above which the operating angle θ is considered to be considerably large, and the threshold dθ2/dt is a lower limit above which the operating or depressing speed of the accelerator pedal 36 is considered to be considerably high. If a negative decision (NO) Is obtained in either one of steps SD1 and SD2, the control flow goes back to the control routine A of FIG. 14. If an affirmative decision (YES) is obtained in both of steps SD1 and SD2, it means that the vehicle is placed in a highly-accelerating mode, and the control flow goes to step SD3 corresponding to the insufficient acceleration determining means 98, to determine whether the actual acceleration G is higher than the desired value $G_M$ which is determined as a function of the operating angle e of the accelerator pedal 36.

Figure 21:
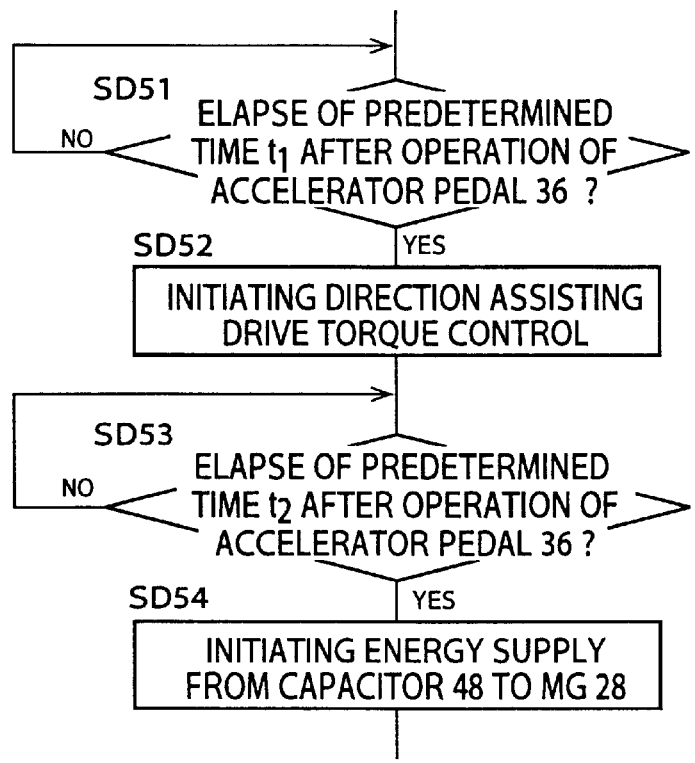
FIG. 21 is a view showing a highly-accelerating assisting drive torque control in step SD5 in the control routine D of FIG. 15.

If an affirmative decision (YES) is obtained in step SD3, that is, if the acceleration G corresponding to the operating angle θ can be obtained, the control flow goes to step SD4 corresponding to the third stored energy amount determining means 110, to determine whether the residual electric energy amount SOC is larger than the threshold $SOC_O$. If an affirmative decision (YES) is obtained in step SD4, the control flow goes to step SD5 corresponding to the highly-accelerating assisting drive torque control means 96, in which steps SD51–SD54 illustrated in the flow chart of FIG. 21 are implemented to obtain the acceleration G of the vehicle as indicated by two-dot chain line in FIG. 11. As a result, the supply of the electric energy generated by the electric generator 24 driven by the engine 10 directly to the MG 28 is initiated in step SD52 when a predetermined time t1 has passed after the operation of the accelerator pedal 36 to accelerate the vehicle, that is, when an affirmative decision (YES) is obtained in step SD51. When the acceleration G has been increased to a value close to the peak value, that is, when a predetermined time t2 (t2>t1) has passed after the operation of the accelerator pedal 36, namely, if an affirmative decision (YES) is obtained in step SD53, the control flow goes to step SD54 in which the supply of the electric energy from the capacitor 48 to the MG 28 is initiated to produce the assisting drive torque. The supply is continued for about two seconds to about three seconds. Step SD5 is followed by steps SD6–SD9 similar to steps SA11–SA14 of the control routine A of FIG. 14, so that the amount of electric energy to be supplied from the capacitor 48 to the MG 28 is gradually reduced, and the operation of the MG 28 is terminated.

Figure 22:
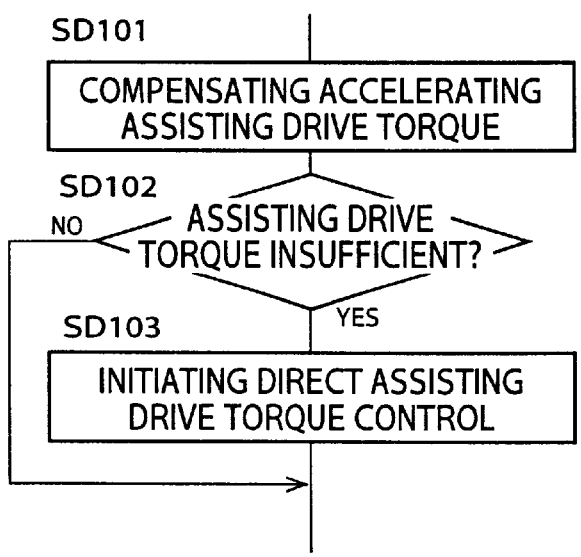
FIG. 22 is a view showing a highly-accelerating assisting drive torque control in step SD10 of the control routine D of FIG. 15.

If a negative decision (NO) is obtained in step SD3, that is, if the desired acceleration $G_M$ corresponding to the operating angle θ of the accelerator pedal 36 cannot be obtained, the control flow goes to step SD10 in which steps SD101–SD103 illustrated in the flow chart of FIG. 22 are implemented. In step SD101 corresponding to the accelerating assisting drive torque compensating means 100, an accelerating assisting drive torque control similar to that in step SA19 is effected, to increase the assisting drive torque generated by the MG 28 and so that the assisting drive torque is generated for a relatively short time, whereby the desired acceleration $G_M$ is obtained by the supply of the electric energy from the capacitor 48 to the MG 28. Step SD101 is followed by step SD102 to determine whether the assisting drive torque generated by the MG 28 operated with the electric energy supplied from the capacitor 48 is insufficient or not. If a negative decision (NO) is obtained in step SD102, the present cycle of execution of the routine is terminated. If an affirmative decision (YES) is obtained in step SD102, the control flow goes to step SD103 corresponding to the IADADTC means 102 indicated above, in which the electric energy generated by the generator 24 driven by the engine 10 is supplied to the MG 28, in addition to the electric energy supplied from the capacitor 48, so that the assisting drive torque generated by the MG 28 is immediately increased. The assisting drive torque thus generated by the MG 28 is larger than the amount of reduction of the output torque of the engine 10 due to the operation of the generator 24.

If an negative decision (NO) is obtained in step SA8 or SA15 of FIG. 14 or in step SD4 of FIG. 15, the control flow goes to the assisting drive torque control routine C illustrated in the flow chart of FIG. 16. That is, if the residual energy amount SOC in the capacitor 48 is found insufficient in any of the above-indicated steps SA8, SA15 and SD4 corresponding to the stored energy amount determining means 66, 74, 110, the control routine C of FIG. 16 is executed to supply the electric energy from the generator 24 directly to the MG 28. The control routine C is initiated with step SC1 to determine whether the vehicle running speed V is lower than the threshold V1 or not. If an affirmative decision (YES) is obtained in step SC1, the control flow goes to step SC2 corresponding to the second POWER MODE selection determining means 92, to determine whether the POWER mode is selected. If a negative decision (NO) is obtained in step SC3 corresponding to the first IEADADTC means 90, in which the supply of the electric energy from the generator 24 directly to the MG 28 is initiated, upon an operation of the accelerator pedal 36 to accelerate the vehicle, and the transmission 14 is shifted down or the lock-up clutch of the torque converter 12 is released, to increase the speed $N_E$ of the engine 10, so that the rear drive wheels 34 are driven by the MG 28 with a drive force which is larger than the amount of reduction of the drive force of the front wheels 20 due to the operation of the generator 24, whereby the vehicle can be sufficiently accelerated with the aid of the assisting drive torque produced by the MG 28.

Then, step SC4 is implemented to determine whether a predetermined time (e.g., about several seconds) has passed after the accelerator pedal 36 has been operated by the vehicle operator to accelerate the vehicle. If a negative decision (NO) is obtained in step SC4, the control flow goes back to step SC3. Steps SC3 and SC4 are repeatedly implemented until the predetermined time has passed. When the predetermined time has passed, that is, if an affirmative decision (YES) is obtained in step SC4, the control flow goes to step SC5, to terminate the assisting drive torque control, and to step SC6 in which the MG 28 is operated as the electric generator by a kinetic energy of the vehicle if the vehicle is decelerated, to generate a regenerative energy, so that the capacitor 48 is charged with the regenerative energy. Step SC6 is followed by step SC7 in which if the deceleration time of the vehicle is shorter than the threshold, the generator 24 is driven by the engine 10 to charge the capacitor 48. It will be understood that steps SC6 and SC7 are implemented for preparation for the next starting and acceleration of the vehicle.

If an affirmative decision (YES) is obtained in step SC2, the control flow goes to step SC8 corresponding to the assisting retarding means 94, in which the supply of the electric energy from the generator 24 to the MG 28 is initiated after a predetermined time (e.g., several seconds) has passed after the operation of the accelerator pedal 36, namely, after the POWER mode has been selected, so that the acceleration G is maximized after the engine speed $N_E$ has been sufficiently raised. In this assisting drive torque control, too, the rear drive wheels 34 are driven with a drive force which is larger than the amount of reduction of the front drive wheels 20 due to the operation of the generator 24, because the supply of the energy from the generator 24 to the MG 28 is initiated only after the engine speed $N_E$ has been raised by a suitable amount by a downshift action of the transmission 14 or a releasing action of the lock-up clutch of the torque converter 12.

If the vehicle speed V is not lower than the threshold V1, that is, if a negative decision (NO) is obtained in step SC1, the control flow goes to step SC9 corresponding to the speed ratio compensating means 114, in which the transmission 14 is shifted down upon operation of the accelerator pedal 36. Step SC9 is followed by step SC10 corresponding to the second IEADADTC means 112, in which the supply of the electric energy from the generator 24 to the MG 28 is initiated to accelerate the vehicle at a medium or high speed V, on the highs roadway surface. Step SC10 is followed by step SC11 to determine whether a predetermined time has passed after the accelerator pedal 36 has been operated. The supply of the electric energy from the generator 24 to the MG 28 is continued until an affirmative decision (YES) is obtained in step SC11. If the affirmative decision is obtained in step SC11, the control flow goes to steps SC5–SC7 described above.

If an affirmative decision (YES) is obtained in step SA2 of FIG. 14 or a negative decision (NO) is obtained in step SA3, that is, if the vehicle is in a running speed or the vehicle speed is not lower than the threshold V0 (is not started at an extremely low speed), the control flow goes to the assisting drive torque control routine B illustrated in the flow chart of FIG. 17. Namely, the control routine B is executed to effect an assisting drive torque control for accelerating the vehicle on the high-$\mu$ roadway surface. The control routine B is initiated with step SB1 to determine whether the vehicle running speed V is higher than the predetermined threshold V1. If a negative decision (NO) is obtained in step SB1, the control flow goes to the control routine A of FIG. 14. If an affirmative decision (YES) is obtained in step SB1, the control flow goes to step SB2 to determine whether the vehicle is being accelerated. This determination is made on the basis of the rate of change of the vehicle running speed V. If a negative decision (NO) Is obtained in step SB2, the present cycle of execution of the control routine B of FIG. 17 is terminated. If an affirmative decision (YES) is obtained in step SB2, the control flow goes to step SB3 to determine whether the vehicle running speed V is lower than the predetermined threshold V2, which is higher than the threshold V1. The threshold V2 is a lower limit above which it is determined that the vehicle is being accelerated during running at a comparatively high speed V.

If an affirmative decision (YES) is obtained in step SB3, the control flow goes to step SB4 to determine whether the operating angle $\theta$ of the accelerator pedal 36 is larger than the predetermined threshold $\theta1$. If an affirmative decision (YES) is obtained in step SB4, the control flow goes to step SB5 to determine whether the rate of change $d\theta/dt$ of the operating angle $\theta$ is higher than the predetermined threshold $d\theta1/dt$. If an affirmative decision (YES) is obtained in step SB5, it means that the accelerator pedal 36 is operated by a comparatively large amount during an ordinary running of the vehicle, for passing another vehicle ahead, for example. In this case, the control flow goes to step SB6 in which the operation of the MG 28 is initiated to provide an assisting drive torque for accelerating the vehicle. The assisting drive torque is generated by the MG 28 for a predetermined time up to the point of time $t_N$, and is held constant for that predetermined time, as indicated in FIGS. 6 and 8. Step SB6 is followed by steps SB8–SB12 similar to steps SA10–SA14 of FIG. 14, in which the constant assisting drive torque is kept generated up to the point of time $t_N$, and then the assisting drive torque is gradually reduced.

If a negative decision (NO) is obtained in at least one of steps SB4 and SB5, it means that the vehicle is required to be relatively smoothly accelerated for a comparatively long time. In this case, the control flow goes to step SB7 in which the assisting drive torque control is initiated. In this assisting drive torque control in step SB7, an assisting drive torque smaller than that in step SB6 is generated by the MG 28 for a time longer than that in step SB6. Step SB7 is also followed by the steps SB8–SB12 described above. If a negative decision (NO) is obtained in step SB3, that is, if the vehicle is required to be accelerated during running at a comparatively high speed V higher than the threshold V2, the control flow goes to step SB13 in which the assisting drive torque control is initiated. In this assisting drive torque control in step SB13, an assisting drive torque which is larger than that in step SB6 and close to the maximum output of the MG 28 is generated for a time shorter than that in step SB6, so that the vehicle can be abruptly accelerated to pass another vehicle ahead. Step SB13 is followed by the steps SB8–SB12.

If a negative decision (NO) is obtained in step SA1, that is, if the roadway surface is a frozen or snow-covered surface or any other surface having a low friction coefficient $\mu$, the control flow goes to the control routine E illustrated in the flow chart of FIG. 18. Namely, the control routine E is executed for effecting an assisting drive torque control during running of the vehicle on the low-$\mu$ roadway surface on which the front drive wheels 20 tend to slip. The control routine E is initiated with step SE1 to determine whether the vehicle running speed V is equal to or lower than the predetermined threshold V1. If a negative decision (NO) is obtained in step SE1, the control flow goes to step SE2 corresponding to the accelerator pedal operation determining means 106, to determine whether the accelerator pedal 36 has been operated to accelerate the vehicle. This determination is based on the rate of change $d\theta/dt$ of the operating angle $\theta$ of the accelerator pedal 36. If an affirmative decision (YES) is obtained in step SE1 or a negative decision (NO) is obtained in step SE2, the present cycle of execution of the present control routine E is terminated. If a negative decision (NO) is obtained in step SE1 and an affirmative decision (YES) is obtained in step SE2, the control flow goes to step SE3 to determine whether the residual energy amount SOC in the capacitor 48 is larger than the threshold $SOC_o$. If an affirmative decision (YES) is obtained in step SE3, the control flow goes to step SE4 corresponding to the low-$\mu$ roadway assisting drive torque control means 108, in which the MG 28 is operated with an electric energy stored in the capacitor 48 or generated by the generator 24, to provide an assisting drive torque suitable for running the vehicle on the low-$\mu$ roadway surface, such that the assisting drive torque is kept generated for a comparatively short time. If a negative decision (NO) is obtained in step SE3, the control flow goes to step SE5 in which the MG 28 is operated with an electric energy directly supplied thereto from the generator 24 driven by the engine 10, such that an assisting drive torque is kept generated for a comparatively short time.

Steps SE4 and SE5 are followed by step SE6 corresponding to the wheel slip determining means 118, to determine whether the drive wheels 20 are slipping on the roadway surface, while the assisting drive torque control with the electric energy supplied from the capacitor 48 is effected as described above. This determination is made by determining whether the slip speed $\Delta V$ of the front wheels 20 is higher than the predetermined threshold $\Delta V2$. If an affirmative decision (YES) is obtained in step SE6, the control flow goes to step SE7 to determine whether the assisting drive torque control has provided an effect of raising the vehicle running speed V, namely, whether the vehicle speed $V_{t+1}$ detected in the present control cycle is higher than the vehicle speed $V_t$ detected in the last control cycle. If a negative decision (NO) is obtained in step SE6 or an affirmative decision (YES) is obtained in step SE7, it means that the front drive wheels 20 are not slipping or that the vehicle speed V has been raised after the wheel slipping was detected. In this case, the present cycle of execution of the control routine E is terminated. If an affirmative decision (YES) is obtained in step SE6 and a negative decision (NO) is obtained in step SE7, the control flow goes to step SE8 corresponding to the low-$\mu$ roadway direct assisting drive torque control means 120, in which the MG 28 is operated with an electric energy generated by the generator 24 driven by the engine 10, to provide an assisting drive torque suitable for driving the vehicle on the low-$\mu$ roadway surface. In this low-$\mu$ roadway direct assisting drive torque control in step SE8, an electric energy stored in the capacitor 48 as well as an electric energy generated by the generator 24 is supplied to the MG 28, if the presently required vehicle output (total drive force of the front and rear wheels 20, 34) is relatively large, or if the output of the generator 24 is lowered due to heat generation.

Step SE8 is followed by step SE9 to determine whether the front wheels 20 are still slipping. This determination is based on whether the slip speed $\Delta V$ of the front wheels 20 is higher than $\Delta V1$ which is lower than the threshold $\Delta V2$. If an affirmative decision (YES) is obtained in step SE9, it means that the front wheels 20 are still slipping even with a load being applied to the engine 10 due to an operation of the generator 24 to effect the direct assisting drive torque control. In this case, the control flow goes to step SE10 corresponding to the low-$\mu$ roadway engine output limiting means 122, in which the opening angle $\theta TH$ of the throttle valve 41 is reduced to reduce the output of the engine 10, for further reducing the drive force of the front drive wheels 20, while the accelerator pedal 36 is kept at the same operating position or angle $\theta$.

Step SE10 is followed by steps SE12, SE13 and SE14 to determine whether a condition for terminating the low-$\mu$ roadway direct assisting drive torque control is satisfied or not. Described more specifically, step SE12 is implemented to determine whether the operating angle $\theta$ is zeroed, namely, the accelerator pedal 36 has been returned to the non-operating position. Step SE13 is implemented to determine whether the slip speed $\Delta V$ is reduced below the threshold $\Delta V1$. Step SE14 is implemented to determine whether a predetermined time (e.g., about five seconds) has passed after the initiation of operation of the accelerator pedal 36. A negative decision (NO) is initially obtained in all of those steps SE12–SE14, and the control flow goes back to step SE8, so that steps SE8–SE14 are repeatedly implemented until a negative decision (NO) is obtained in step SE9 or if an affirmative decision (YES) is obtained in any of the steps SE12–SE14.

If the negative decision is obtained in step SE9 as a result of removal of the slipping state of the front wheels 20 owing to the output reduction or limitation of the engine 10, the control flow goes to step SE11 to terminate the output limitation of the engine 10, while permitting the direct assisting drive torque control to continue. Step SE15 is implemented to terminate the direct assisting drive torque control, if the affirmative decision (YES) is obtained in step SE12, SE13 or SE14 as a result of operator's releasing of the accelerator pedal 36 to zero the operating angle $\theta$, reduction of the slip speed $\Delta V$ below the threshold $\Delta V1$ (removal of the slipping state of the front wheels 20) or lapse of the predetermined time after the operation of the accelerator pedal 36. Step SE15 is followed by step SE16 to determine whether the residual energy amount SOC in the capacitor 48 is larger than the threshold $SOC_o$. If a negative decision (NO) is obtained in step SE16, the control flow goes to step SE17 to operate the generator 24 to charge the capacitor 48. If an affirmative decision (YES) is obtained in step SE16, the control flow goes to step SE18 to terminate the charging of the capacitor 48 by the generator 24. Step SE18 is followed by step SE19 to reset a flag for terminating the present control routine E.

As described above, the control apparatus of the present embodiment for the automotive vehicle having the engine 10 and the MG 28 includes the first control means (in the form of the fuel-saving assisting drive torque control means 70 and the accelerating assisting drive torque control means 80) for controlling the MG 28 such that the assisting drive torque which is generated by the MG 28 and applied to the vehicle in addition to the primary drive torque generated by the engine 10 increases with an increase in the vehicle output desired by the vehicle operator and such that the MG 28 is operated for a length of time which decreases with the increase of the desired vehicle output.

The control apparatus of the present embodiment further comprises: roadway surface friction coefficient determining means (in the form of the high-$\mu$ roadway surface determining means 60) for determining whether the friction coefficient $\mu$ of the roadway surface on which the vehicle lies is lower than a predetermined threshold; and second control means (in the form of the low-$\mu$ roadway direct assisting drive torque control means 120 and the low-$\mu$ roadway engine output limiting means 122) operable when the roadway surface friction coefficient determining means has determined that the friction coefficient of the roadway surface is lower than the predetermined threshold, the. second control means reducing the output of the engine 10 and operating the MG 28. In this case, the first control means indicated above operates the MG 28 such that the assisting drive torque increases with the increase of the required output of the vehicle and such that the length of time of the MG 28 decreases with the increase of the required vehicle output, when the roadway surface friction coefficient determining means has determined that the friction coefficient of the roadway surface is not lower than the predetermined threshold. Thus, the first control means is operated when the friction coefficient of the roadway surface is comparatively high, to operate the MG 28 such that the assisting drive torque generated by the auxiliary drive power source increases as the vehicle operator's desired vehicle output is increased, and such that the length of operation of the MG 28 decreases as the desired vehicle output is increased. Accordingly, the drivability of the vehicle is further improved, making it possible to prevent a further increase of the operating amount of the accelerator pedal 36 and reduce the required amount of fuel consumption by the vehicle. In addition, the second control means reduces the output of the engine 10 and operates the MG 28 when the vehicle is running on the roadway surface having a comparatively low friction coefficient $\mu$, so that the slipping of the drive wheels can be suitably prevented on the low-$\mu$ roadway surface, assuring a sufficient vehicle drive torque on the low-$\mu$ roadway surface.

The control apparatus of the present invention further comprises third control means (in the form of the engine output limiting means 84) operable when the roadway surface friction coefficient determining means (high-$\mu$ roadway surface determining means 60) has determined that the friction coefficient is not lower than the predetermined threshold. The third control means is adapted to reduce the output of the engine 20 with an increase of the assisting drive torque generated by the MG 28, so that the actual vehicle acceleration G is limited to the desired value $G_M$. Since the output of the engine 10 is reduced or limited according to the assisting drive torque generated by the MG 28 even when the vehicle is running on a dry surface having a comparatively high friction coefficient, the fuel consumption of the vehicle can be further reduced. Namely, since the desired vehicle acceleration $G_M$ corresponding to the operator's desired vehicle output is obtained by the third control means, an unnecessary amount of consumption of the fuel by the engine 10 can be removed, and the fuel economy of the vehicle can be further improved.

Further, the present embodiment is adapted to reduce the amount of fuel or energy consumption of the engine 10, since the assisting drive torque control means (in the form of the fuel-saving assisting drive torque determining means 70 and the accelerating assisting drive torque determining means 80) operates the engine 10 on the basis of the operator's desired vehicle output and simultaneously operates the MG 28 such that the assisting drive torque generated by the MG 28 is a predetermined percentage or ratio of the primary drive torque generated by the engine 10, and the fourth control means controls the MG 28 so as to optimize a percentage of the assisting drive torque with respect to the primary drive torque, on the basis of the energy consuming state of the engine 10 after initiation of the operation of the MG 28.

In the present embodiment, the fifth control means (in the form of the fuel-saving assisting drive torque control means 68, the accelerating assisting drive torque control means 78, engine output limiting means 84, the first POWER MODE selection determining means 86 and the engine output limitation inhibiting means 88) is provided for operating the MG 28 while limiting an output of the engine 10 when a required output of the vehicle which is desired by an operator of the vehicle is smaller than a predetermined threshold and when the POWER mode is not selected by said operator. The fifth control means is further adapted to reduce the amount of limitation of the output of the engine 10, while controlling the MG 28, when the required vehicle output is not smaller than the predetermined threshold and when the POWER mode is selected by the operator, such that the assisting drive torque which is generated by the MG 28 and applied to the vehicle in addition to the engine 10 generated by the engine 10 is made larger than that when the required vehicle output is smaller than the predetermined threshold and when the POWER mode is not selected, and such that the MG 28 is operated for a shorter length of time than when said required output is smaller than the predetermined threshold and when the POWER mode is not selected. In the present embodiment, the MG 28 is operated while the output of the engine 10 is limited, when the operator's desired vehicle output is comparatively small (in a fuel-saving running mode or during running of the vehicle with a relatively small load) and when the POWER mode is not selected by the operator. When the operator's desired vehicle output is comparatively large (in an accelerating mode or during running of the vehicle with a relatively large load), on the other hand, the output limitation of the engine 10 is reduced while the MG 28 is controlled such that the assisting drive torque is made comparatively large and such that the length of operation of the MG 28 is comparatively short. In this arrangement, the manner of operation of the MG 28 is changed depending upon the presently selected running mode of the vehicle, so that the output of the MG 28 is optimized and the fuel consumption by the engine 10 is reduced. Since the output limitation of the engine 10 is reduced when the POWER mode is selected, the drivability of the vehicle is improved.

Further, the sixth control means provided in the present embodiment is constituted by the form of the fuel-saving assisting drive torque control means 68, the accelerating assisting drive torque control means 78, the highly-accelerating assisting drive torque control means 96, the insufficient acceleration determining means 98, the accelerating assisting drive torque compensating means 100, and the IADADTC means 102). The sixth control means operates in two different manners depending upon whether the vehicle output desired by the operator is larger than the predetermined threshold or not. While the operator's desired vehicle output is not larger than the threshold, the sixth control means supplies the electric energy from energy storing means in the form of the capacitor 48 to the auxiliary drive power source in the form of the MG 28 such that the assisting drive torque generated by the auxiliary drive power source is relatively small. While the operator's desired vehicle output is larger than the threshold, the sixth control means supplies not only the energy stored in the energy storing means but also the energy generated by energy generating means in the form of the electric generator 24 operated by the primary drive power source in the form of the engine 10, to the auxiliary drive power source, such that the assisting drive torque is larger than while the desired vehicle output is not larger than the threshold and such that the length of time of operation of the auxiliary drive power source is shorter than while the desired vehicle output is not larger than the threshold. Accordingly, the operation of the auxiliary drive power source is maximized, and the drivability of the vehicle is improved when the vehicle load is large or the desired vehicle drive power is comparatively large.

The seventh control means also provided in the present embodiment is constituted by the second IEADADTC means 112 and the speed ratio compensating means 112. The seventh control means is operated when the stored energy amount determining means in the form of the third stored energy amount determining means 110 has determined that the residual energy amount SOC stored in the energy storing means in the form of the capacitor 48 is insufficient or smaller than the predetermined threshold. The seventh control means supplies the energy from the energy generating means in the form of the electric generator 24 operated by the primary drive power source in the form of the engine 10, to the auxiliary drive power source in the form of the MG 28, and increases the speed ratio of the transmission 14 so as to increase the vehicle drive force. In this arrangement, when the energy amount stored in the capacitor 48 is determined to be insufficient, the seventh control means effects a direct assisting drive torque control in which the electric energy generated by the generator 24 operated by the engine 10 is supplied to the MG 28, and at the same time the speed ratio of the transmission 14 operatively connected to the engine 10 is increased. As a result of an increase in the speed ratio of the transmission 14, the output of the MG 28 is optimized even while the energy amount stored in the capacitor 48 is reduced. This arrangement eliminates an otherwise possible deterioration of the vehicle drivability due to a decrease in the assisting drive torque caused by a decrease in the residual energy amount stored in the capacitor 48.

Further, the eighth control means (in the form of the second POWER MODE selection determining means 92 and the assisting retarding means 94) also provided in the illustrated embodiment is operated when an electric energy is supplied from energy generating means in the form of the electric generator 24 operated by the primary drive power source in the form of the engine 10 is supplied to the auxiliary drive power source in the form of the MG 28. The eighth control means operates the auxiliary drive power source in one of the first and second modes, which may be selected depending upon whether the POWER mode is selected by the vehicle operator or not. Namely, when the POWER mode is selected, the eighth control means operates the auxiliary drive power source in the first mode such that the moment of initiation of the operation of the auxiliary drive power source with the energy supplied from the energy generating means is retarded by the predetermined time after the moment at which the vehicle operator's operation to increase the vehicle output is performed. In the second mode selected when the POWER mode is not selected, the eighth control means operates the auxiliary drive power source such that the operation of the auxiliary drive power source is initiated at the same time when the operator's operation to increase the vehicle output is performed. In the first mode selected when the POWER mode is selected, the operation of the auxiliary drive power source is initiated the predetermined time after the operator's operation to increase the vehicle output or accelerate the vehicle, so that the peak of the acceleration of the vehicle can be increased, whereby a sufficiently large drive force for accelerating the vehicle can be temporarily obtained. In the second mode selected when the POWER mode is not selected, on the other hand, the operation of the auxiliary drive power source is initiated concurrently with the operator's operation to accelerate the vehicle, so that the vehicle can be accelerated with a reduced time delay from the moment of the operator's operation to accelerate the vehicle, to the moment at which the generation of an assisting drive torque by the auxiliary drive power source is initiated.

In addition, the ninth control means (highly-accelerating assisting drive torque control means 96) also provided in the illustrated embodiment is operated when an operation to accelerate the vehicle is performed by the operator. The ninth control means first initiates a supply of an energy to the auxiliary drive power source in the form of the MG 28 from energy generating means in the form of the electric generator 24 driven by the primary drive power source in the form of the engine 10, and then initiates a supply of an energy from energy storing means in the form of the capacitor 48 to the auxiliary drive power source when the predetermined time has passed after the moment of initiation of the supply of the energy from the energy generating means to the auxiliary drive power source. Accordingly, the acceleration of the vehicle can be increased when the vehicle operator performs an operation to accelerate the vehicle. Further, the vehicle can be accelerated for a sufficiently long time.

In the automotive vehicle to which the control apparatus according to the illustrated embodiment is applied, the engine 10 serves as the primary drive power source for generating the primary drive torque for driving the front-wheel drive system, while the MG 28 serves as the auxiliary or secondary drive power source for generating the assisting drive torque for driving the rear-wheel drive system. While the MG 28 is in operation, both of the front-wheel and rear-wheel drive systems are driven, so that the vehicle-can be driven with a sufficient drive force or can be accelerated with high drivability, even on a frozen, snow-covered or other roadway surface having a relatively low friction coefficient.

While the presently preferred embodiment of the present invention has been described above by reference to the accompanying drawings, it is to be understood that the invention may be otherwise embodied.

The control apparatus according to the illustrated embodiment is applied to a four-wheel-drive hybrid automotive vehicle which is driven primarily by the primary drive wheels in the form of the front drive wheels 20 driven by the engine 10 disposed in the front portion of the vehicle, and optionally by the auxiliary or secondary drive wheels in the form of the rear drive wheels 34 driven by the motor/generator (MG) 28 disposed in the rear portion of the vehicle. However, a control apparatus according to the principle of the present invention is equally applicable to other types of automotive vehicle such as: a four-wheel-drive hybrid automotive vehicle equipped with a front engine for driving rear wheels as the primary drive wheels, and a motor/generator for driving front wheels as the auxiliary drive wheels; a four-wheel-drive automotive vehicle equipped with a rear engine for driving rear wheels as the primary drive wheels, and a motor/generator for driving front wheels as the auxiliary drive wheels; an automotive vehicle wherein an engine and a motor/generator are provided for front wheels or rear wheels; and an automotive vehicle wherein an engine and a motor/generator are disposed coaxially with each other and the motor/generator is optionally operated to provide an assisting drive torque in addition to a drive torque generated by the engine.

In the illustrated embodiment, the vehicle has a plurality of drive power sources in the form of the engine 10 and the MG 28. However, the present invention is equally applicable to: an automotive vehicle having two motors/generators; an automotive vehicle having a plurality of composite drive power sources which are disposed at respective different portions of the vehicle and each of which includes an engine and an electric motor; and an automotive vehicle including an engine and/or a motor/generator and at least one other type of drive power source such as a hydraulic motor. Further, the present invention is applicable to an automotive vehicle wherein a power transmitting system other than that in the illustrated embodiment is disposed between the drive power source or sources and the drive wheels.

While the capacitor 48 used in the illustrated embodiment is designed to store an electric energy electrostatically by polarization of a dielectric body, the automotive vehicle to which the present invention is applied may use an energy storing device adapted to store an electric energy electrochemically.

Although the generator 24 in the illustrated embodiment is used exclusively as an electric generator, this generator 24 may also be used as a starter motor for starting the engine 10, and/or an electric motor for providing an assisting drive torque during starting of the vehicle. The generator 24 may also be used as an electric motor for operating a compressor of an air-conditioning system, an oil pump of a power steering system, or other optionally provided device, while the vehicle is held stationary with the engine 10 held in the off state.

It will be understood that the steps in the control routines illustrated in the flow charts of FIGS. 14–18 may be partially deleted and/or modified, as needed, or other desired steps may be added therein, provided that such deletion, modification and addition permit the control apparatus to achieve the functions necessary to embody the present invention.

In the illustrated embodiment, the eighth control means provided by the second POWER MODE selection determining means (step SC2) and the assisting retarding means 94 (step SC8) has a first operation mode in which an operation of the MG 28 is initiated a predetermined time after the moment of a vehicle operator's operation to increase the output of the vehicle, and a second operation mode in which the operation of the MG 28 is initiated at the moment time when the vehicle operator's operation is performed. Although the first or second operation mode is selected depending upon whether the POWER mode is selected by the vehicle operator or not, the selection of the first or second operation mode may depend upon the other vehicle running conditions, whether any other mode is selected by the operator, and/or operating states of the vehicle drive system. Further, the manner of selection of the first or second operation mode may be determined depending upon whether the vehicle is of a front-engine front-drive (FF) type or a front-engine rear-drive (FR) type, whether the vehicle is a four-wheel-drive vehicle (4WD), and/or the vehicle uses a manual transmission (MT), an automatic transmission (AT) or a continuously variable transmission (CVT).

It is to be understood that the present invention may be embodied with various other changes, modifications and improvements, which may occur to those skilled in the art, without departing from the spirit and scope of the invention defined in the following claims:

What is claimed is:

1. An apparatus for controlling an automotive vehicle having a primary drive power source and an auxiliary drive power source, comprising;

required output determining means for determining a required output of the vehicle which is desired by an operator of the vehicle; and first control means for controlling said auxiliary drive power source such that an assisting drive torque which is generated by said auxiliary drive power source and applied to said vehicle in addition to a primary drive torque generated by said primary drive power source increases with an increase of said required output of the vehicle and such that said auxiliary drive power source is operated for a length of time which decreases with the increase of said required output.

2. An apparatus according to claim 1, wherein said primary drive power source is operable to generate said primary drive torque for driving one of a front-wheel drive system and a rear-wheel drive system of the vehicle while said auxiliary drive power source is to generate said assisting drive torque for driving the other of said front-wheel and rear-wheel drive systems.

3. An apparatus according to claim 2, wherein said primary drive power source is an internal combustion engine, while said auxiliary drive power source is an electric motor.

4. An apparatus according to claim 2, further comprising assisting drive torque compensating means for compensating said assisting drive torque as determined by said first control means, so as to determine a ratio of the assisting drive torque as compensated by said assisting drive torque compensating means to said primary device torque, to maximize fuel economy of said internal combustion engine.

5. An apparatus according to claim 1, further comprising:

roadway surface friction coefficient determining means for determining whether a friction coefficient of a roadway surface on which the vehicle lies is lower than a predetermined threshold; and second control means operable when said roadway surface friction coefficient determining means has determined that said friction coefficient of said roadway surface is lower than said predetermined threshold, said second control means reducing an output of said primary drive power source and operating said auxiliary drive power source, and wherein said first control means operates said auxiliary drive power source such that said assisting drive torque increases with said increases of said required output of the vehicle and such that said length of time of operation of said auxiliary drive power source decreases with said increase of said required output, when said roadway surface friction coefficient determining means has determined that said friction coefficient is not lower than said predetermined threshold.

6. An apparatus according to claim 5, further comprising third control means operable when said roadway surface friction coefficient determining means has determined that said friction coefficient is not lower than said predetermined threshold, said third control means reducing an output of said primary drive power source with an increase in said assisting drive torque generated by said auxiliary drive power source.

7. An apparatus for controlling an automotive vehicle having a primary drive power source and an auxiliary drive power source, comprising:

assisting drive torque control means for operating said primary drive power source to generate a primary drive torque on the basis of a required output of the vehicle which is desired by an operator of the vehicle, and simultaneously operating said auxiliary drive power source such that an assisting drive torque which is generated by said auxiliary drive power source and applied to the vehicle in addition to said primary drive torque is a predetermined percentage of said primary drive torque; and auxiliary drive power source control means operable after initiation of an operation of said auxiliary drive power source, for controlling said auxiliary drive power source so as to optimize a percentage of said assisting drive torque with respect to said primary drive torque, on the basis of an energy consuming state of said primary drive power source.

8. An apparatus according to claim 7, wherein said primary drive power source is an internal combustion engine operable to generate said primary drive torque for driving one of a front-wheel drive system and a rear-wheel drive system of the vehicle while said auxiliary drive power source is an electric motor operable to generate said assisting drive torque for driving the other of said front-wheel and rear-wheel drive systems.

9. An apparatus for controlling an automotive vehicle having a primary drive power source and an auxiliary drive power a source, comprising;

energy supply control means for operating said auxiliary drive power source while limiting an output of said primary drive power source when a required output of the vehicle which is desired by an operator of the vehicle is smaller than a predetermined threshold and when a power mode in which the vehicle is driven with modified shift boundaries is not selected by said operator, said energy supply control means reducing an amount of limitation of the output of said primary drive power source, while controlling said auxiliary drive power source, when said required output of the vehicle is not smaller than said predetermined threshold and when said power mode is selected by said operator, such that an assisting drive torque which is generated by said auxiliary drive power source and applied to the vehicle in addition to a primary drive power source generated by said primary drive power source is made larger than that when said required output is smaller than said predetermined threshold and when said power mode is not selected, and such that said auxiliary drive power source is operated for a shorter length of time than when said required output is smaller than said predetermined threshold and when said power mode is not selected.

10. An apparatus according to claim 9, wherein said primary drive power source is an internal combustion engine operable to generate said primary drive torque for driving one of a front-wheel drive system and a rear-wheel drive system of the vehicle while said auxiliary drive power source is an electric motor operable to generate said assisting drive torque for driving the other of said front-wheel and rear-wheel drive systems.

11. An apparatus for controlling an automotive vehicle having a primary drive power source, an energy storing means for storing an energy, an auxiliary drive power source operated with the energy stored in said energy storing means, and energy generating means operated by said primary drive power source, for generating an energy, comprising:

required output determining means for determining whether a required output of the vehicle which is desired by an operator of the vehicle is larger than a predetermined threshold; and energy supply control means for supplying the energy from said energy storing means to said auxiliary drive power source such that an assisting drive torque which is generated by said auxiliary drive power source and applied to said vehicle in addition to a primary drive torque generated by said primary drive power source is relatively small, while said required output of the vehicle determined by said required output determining means is not larger than said predetermined threshold, and wherein while said required output of the vehicle determined by said required output determining means is larger than said predetermined threshold, said energy supply control means supplies not only the energy stored in said energy storing means but also the energy generated by said energy generating means to said auxiliary drive power source, such that the assisting drive torque generated by said auxiliary drive power source is larger than while said required output is not larger than said predetermined threshold and such that said auxiliary drive power source is operated for a length of time shorter than while said required output is not larger than said predetermined threshold.

12. An apparatus according to claim 11, wherein said primary drive power source is an internal combustion engine operable to generate said primary drive torque for driving one of a front-wheel drive system and a rear-wheel drive system of the vehicle while said auxiliary drive power source is an electric motor operable to generate said assisting drive torque for driving the other of said front-wheel and rear-wheel drive systems.

13. An apparatus for controlling an automotive vehicle having a primary drive power source, an energy storing means for storing an energy, an auxiliary drive power source operated with the energy stored in said energy storing means, energy generating means operated by said primary drive power source, for generating an energy, and a transmission operatively connected to said primary drive power source, comprising:

stored energy amount determining means for determining whether an amount of energy stored in said energy storing means is smaller than a predetermined threshold; and energy supply control means operable when said stored energy amount determining means has determined that the amount of energy stored in said energy storing means is smaller than said predetermined threshold, for supplying the energy from said energy generating means to said auxiliary drive power source, and increasing a speed reduction ratio of said transmission so as to increase a drive force of the vehicle.

14. An apparatus according to claim 13, wherein said primary drive power source is an internal combustion engine operable to generate said primary drive torque for driving one of a front-wheel drive system and a rear-wheel drive system of the vehicle while said auxiliary drive power source is an electric motor operable to generate said assisting drive torque for driving the other of said front-wheel and rear-wheel drive systems.

15. An apparatus for controlling an automotive vehicle having a primary drive power source, an energy storing means for storing an energy, an auxiliary drive power source operated with the energy stored in said energy storing means, and energy generating means operated by said primary drive power source, for generating an energy, comprising:

auxiliary drive power source control means for operating said auxiliary drive power source with an energy suppled from said energy generating means, in a selected one of a first mode and a second mode, said auxiliary drive power source control means operating said auxiliary drive power source in said first mode such that a moment of initiation of an operation of said auxiliary drive power source with the energy supplied from said energy storing means is retarded by a predetermined time after a moment at which an operation performed by an operator of the vehicle to increase an output of the vehicle is initiated, said auxiliary drive power source control means operating said auxiliary drive power source in said second mode such that the operation of the auxiliary drive power source with the energy supplied from said energy storing means is initiated at the moment at which the operation performed by the operator is initiated.

16. An apparatus according to claim 15, wherein said primary drive power source is an internal combustion engine operable to generate said primary drive torque for driving one of a front-wheel drive system and a rear-wheel drive system of the vehicle while said auxiliary drive power source is an electric motor operable to generate said assisting drive torque for driving the other of said front-wheel and rear-wheel drive systems.

17. An apparatus according to claim 15, further comprising power mode selection determining means for determining whether a power mode for driving the vehicle with high drivability is selected by the operator of the vehicle.

18. An apparatus for controlling an automotive vehicle having a primary drive power source, an energy storing means for storing an energy, an auxiliary drive power source operated with the energy stored in said energy storing means, and energy generating means operated by said primary drive power source, for generating an energy, comprising:

energy supply control means operable when an operation to accelerate the vehicle is performed by an operator of the vehicle, for first initiating a supply of an energy from said energy generating means to said auxiliary drive power source, and then initiating a supply of an energy from said energy storing means to said auxiliary drive power source when a predetermined time has passed after a moment of initiation of said supply of the energy from said energy generating means to said auxiliary drive power source.

19. An apparatus according to claim 18, wherein said primary drive power source is an internal combustion engine operable to generate said primary drive torque for driving one of a front-wheel drive system and a rear-wheel drive system of the vehicle while said auxiliary drive power source is an electric motor operable to generate said assisting drive torque for driving the other of said front-wheel and rear-wheel drive systems.

* * * * *